United States Patent [19]
Kato et al.

[11] Patent Number: 5,883,660
[45] Date of Patent: Mar. 16, 1999

[54] DIGITAL COPIER FOR TWO-SIDED READING USING VARIOUS WRITING MODES

[75] Inventors: Akio Kato; Keichi Kinoshita, both of Toyokawa, Japan

[73] Assignee: Minolta Camera Kabushiki Kaishi, Osaka, Japan

[21] Appl. No.: 607,881

[22] Filed: Feb. 28, 1996

Related U.S. Application Data

[63] Continuation of Ser. No. 80,962, Jun. 22, 1993, abandoned.

[30] Foreign Application Priority Data

| Jun. 22, 1991 | [JP] | Japan | 4-163132 |
| Jun. 22, 1992 | [JP] | Japan | 4-163133 |
| Jun. 22, 1992 | [JP] | Japan | 4-163134 |

[51] Int. Cl.[6] ............ B41J 2/435; G01D 15/24; H01S 1/131; G11B 7/00
[52] U.S. Cl. ............ 347/262; 347/264; 347/139; 347/153; 358/296
[58] Field of Search .............. 355/318, 374, 355/308; 358/296, 300, 302; 347/262, 264, 139, 153

[56] References Cited

U.S. PATENT DOCUMENTS

| 4,066,252 | 1/1978 | Wick | 271/3 |
| 4,365,889 | 12/1982 | Silverberg | 355/14 SH |
| 4,499,500 | 2/1985 | Nagashima | 358/296 |
| 4,568,169 | 2/1986 | Wada et al. | 355/3 SH |
| 4,819,029 | 4/1989 | Ito | 355/7 |
| 4,943,832 | 7/1990 | Emori | 395/85 |
| 4,949,189 | 8/1990 | Ohmori | 358/474 |
| 5,038,182 | 8/1991 | Tanimoto | 399/374 |

*Primary Examiner*—Benjamin R. Fuller
*Assistant Examiner*—Raquel Yvette Gordon
*Attorney, Agent, or Firm*—Sidley & Austin

[57] ABSTRACT

A double-side digital copier reads an image on documents fed into an image reading unit in accordance with a predetermined cycle based on copying conditions such as the number of copies to be made and single/double-side copying, and the number of documents and copy sheets temporarily maintained in the respective circulation paths formed therein. Further the image data obtained by that reading are stored in two memories alternately, one of the memories alone, or both the memories in a predetermined order in accordance with the predetermined cycle, and are read out in a corresponding order, optimizing throughput without increasing the manufacturing costs.

7 Claims, 33 Drawing Sheets

Fig. 9    Document Feeding 1

☐ denotes suspension

| Mode / Copy number | Single/Single | Single/Double | Double/Double |
|---|---|---|---|
| 1 | Every copy number | Successively 3 - ②- 1 - ①- 1 - ②- 1 - ①- 1 - ① 1 - ②- 1 - ② Copy number÷3=a⋯b b≠0, every copy number×6 1 - ②- 1 - copy number×2-b-4 - 1 - ②- 1 - (copy number÷ b)×2-7 - 1 - ②- 1 - copy number 2-b-1) b=0, every copy number×2 1 - ②- 1-copy number ×2-b-4 | Every copy number×2 |
| 2 |  |  | 1 - ①- 1 - ④- 1 - ④ Copy number÷3=a⋯b Every copy number×2-b |
| 3 |  |  | 3 - ③ |
| 4 |  |  |  |
| 5 |  |  |  |
| 6 |  |  |  |
| 7 |  |  |  |

Fig. 10

Document Feeding 2      □=suspension

| Mode / Copy number | Single/Single | Single/Double | Double/Single | Double/Double |
|---|---|---|---|---|
| 1 | Every copy number | Continous | 2 - [2] | 2 - [2] |
| 2 | ---- | Every 2 documents | Evey copy number ×2 | Every copy number×2 |
| 3 | | Copy number÷2=a···b  1 - [1] - 1 - Copy number×2-3-b  1 - [1] - 1 - Copy number×2-3+b - | ---- | Copy number÷2=a···b  1-Copy number×2-1-b  1-Copy number×2-1+b |
| 4 | | ---- | | ---- |
| 5 | | | | |
| 6 | | | | |
| ... | | | | |

Fig. 21a — Mode 3

| Copy number \ Mode | Single/Single | Single/Double | Double/Single | Double/Double |
|---|---|---|---|---|
| 1 | ○ | × | × | ○ |
| 2 | ○ | × | × | × |
| 3 | ○ | ○ | ○ | ○ |
| 4 | ○ | × | × | × |
| 5 | ○ | × | × | × |
| 6 | ○ | × | × | × |

Fig. 21b — Mode 4

| Copy number \ Mode | Single/Single | Single/Double | Double/Single | Double/Double |
|---|---|---|---|---|
| 1 | ○ | × | × | ○ |
| 2 | ○ | ○ | ○ | × |
| 3 | ○ | ○ | ○ | ○ |
| 4 | ○ | ○ | ○ | ○ |
| 5 | ○ | ○ | ○ | ○ |
| 6 | ○ | ○ | ○ | ○ |

Fig. 21c — Mode 1

| Copy number \ Mode | Single/Single | Single/Double | Double/Single | Double/Double |
|---|---|---|---|---|
| 1 | ○ | ○ | ○ | ○ |
| 2 | ○ | × | ○ | ○ |
| 3 | ○ | ○ | ○ | ○ |
| 4 | ○ | × | × | × |
| 5 | ○ | × | × | × |
| 6 | ○ | × | × | × |

Fig. 21d — Mode 2

| Copy number \ Mode | Single/Single | Single/Double | Double/Single | Double/Double |
|---|---|---|---|---|
| 1 | | | × | ○ |
| 2 | | | ○ | ○ |
| 3 | | | ○ | ○ |
| 4 | | | ○ | ○ |
| 5 | | | ○ | ○ |
| 6 | | | ○ | ○ |

Fig. 21e — Mode 11

| Copy number \ Mode | Single/Single | Single/Double | Double/Single | Double/Double |
|---|---|---|---|---|
| 1 | | × | | ○ |
| 2 | | ○ | | ○ |
| 3 | | ○ | | ○ |
| 4 | | ○ | | ○ |
| 5 | | ○ | | ○ |
| 6 | | ○ | | ○ |

Fig. 22a — Mode 3

| Copy number \ Mode | Single/Single | Single/Double | Double/Single | Single/Double |
|---|---|---|---|---|
| 1 | ○ | × | × | ○ |
| 2 | ○ | ○ | × | ○ |
| 3 | ○ | × | × | × |
| 4 | ○ | × | × | × |
| 5 | ○ | × | × | × |
| 6 | ○ | × | × | × |

Fig. 22b — Mode 4

| Copy number \ Mode | Single/Single | Single/Double | Double/Single | Double/Double |
|---|---|---|---|---|
| 1 | ○ | × | × | ○ |
| 2 | ○ | ○ | ○ | ○ |
| 3 | ○ | ○ | ○ | ○ |
| 4 | ○ | ○ | ○ | ○ |
| 5 | ○ | ○ | ○ | ○ |
| 6 | ○ | ○ | ○ | ○ |

Fig. 22c — Mode 1

| Copy number \ Mode | Single/Single | Single/Double | Double/Single | Double/Double |
|---|---|---|---|---|
| 1 | ○ | × | × | ○ |
| 2 | ○ | ○ | ○ | ○ |
| 3 | ○ | × | × | × |
| 4 | ○ | × | × | × |
| 5 | ○ | × | × | × |
| 6 | ○ | × | × | × |

Fig. 22d — Mode 2

| Copy number \ Mode | Double/Single | Double/Double |
|---|---|---|
| 1 | × | ○ |
| 2 | ○ | ○ |
| 3 | ○ | ○ |
| 4 | ○ | ○ |
| 5 | ○ | ○ |
| 6 | ○ | ○ |

Fig. 22e — Mode 11

| Copy number \ Mode | Single/Double | Double/Double |
|---|---|---|
| 1 | × | ○ |
| 2 | ○ | ○ |
| 3 | ○ | ○ |
| 4 | ○ | ○ |
| 5 | ○ | ○ |
| 6 | ○ | ○ |

Fig. 23a
Single/Single Mode
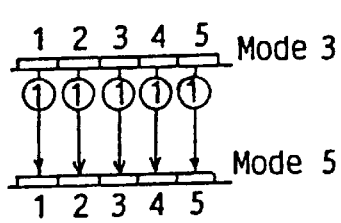
Fig. 23b
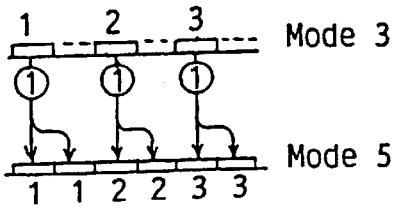
Single/Double Mode
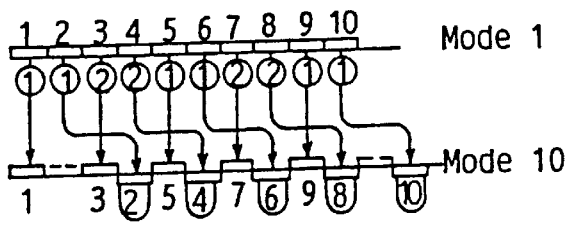
Fig. 24a
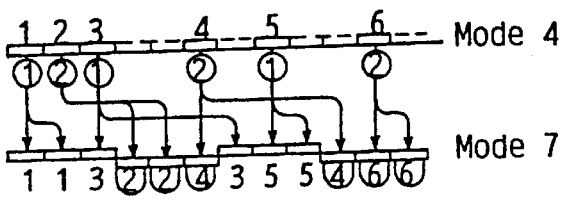
Fig. 24b
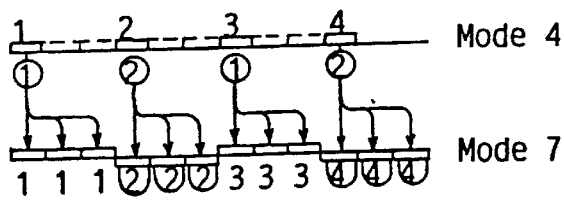
Fig. 24c
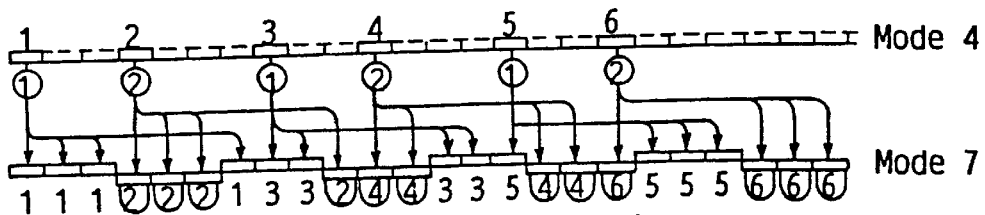
Fig. 24d
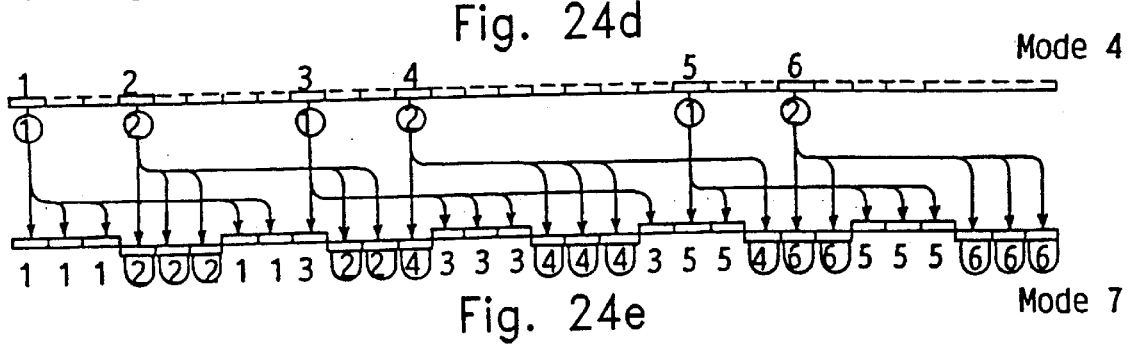
Fig. 24e Double/Single Mode Mode 1

Mode 10

Mode 4

Mode 6

Mode 4

Mode 7

Mode 4

Mode 6

Double/Double Mode

Mode 1

Mode 9

Mode 1

Mode 7

Mode 3

Mode 5

Mode 2

Mode 11

Single/Double Mode

Double/Single Mode

Double/Double Mode

Double/Double Mode

Double/Double Mode

Single/Double Mode

Double/Single Mode

Double/Double Mode

DIGITAL COPIER FOR TWO-SIDED READING USING VARIOUS WRITING MODES

This application is a continuation of application Ser. No. 08/080,962, filed Jun. 22, 1993, abandoned.

BACKGROUND OF THE INVENTION (1) Field of the Invention

The present invention relates to a digital double-side copier which can copy one or both sides of an original document onto one or both sides of a copy sheet.

(2) Description of Related Art

An electrophotographic copier essentially comprises an image reading unit with a document feeder, and an image forming unit with a copy sheet feeder. With this copier, a document is fed to an image reader by the document feeder, and an optical system reads an image on the document and converts it into image data, which are outputted into the image forming unit. Upon input of the image data, the image forming unit forms an electrostatic latent image on a photosensitive drum through exposure, thence a toner image with a supply of toner. Subsequently, the toner image is transferred and fixed onto a copy sheet fed from the copy sheet feeder through an image forming path.

To meet today's need, the electrophotographic copier was upgraded to enable double-side copying, and a digital-copier with the image reader is a good example. The image reading unit in this type of copier reads images on one or both sides of a document, and the image forming unit transfers images onto one or both sides of a copy sheet. Thus, users can select a desired side-mode among 4 combinations as set forth in Table 1.

TABLE 1

| Side-Mode Setting | Reading | Image Forming |
| --- | --- | --- |
| Single/Single | Single-side | Single-side |
| Single/Double | Single-side | Double-side |
| Double/Single | Double-side | Single-side |
| Double/Double | Double-side | Double-side |

The image reading unit of the double-side copier additionally includes a document circulation path for feeding the document again into the image reader by reversing the side thereof. Likewise, the image forming unit thereof additionally includes a copy sheet circulation path besides the image forming path for feeding the copy sheet again into an image transfer station by reversing the side thereof.

To date, several types of double-side copiers are devised by exploiting the above construction. An example is disclosed in U.S. Pat. No. 4,499,500, wherein two memories are installed in the image forming apparatus: one for image data on the front side, and the other for the back side. Another example is disclosed in U.S. Pat. No. 4,568,169, wherein a transportation speed in the circulation path is varied in accordance with the number of copies or a copy sheet size to hold several copy sheets thereon while transporting them back to the image transfer station, enabling steadily image forming on one side per several copy sheets.

However, in the former, overall throughput is decreased considerably; for the image forming on the back side must be suspended until the copy sheet is fed into the image forming station again through the copy sheet circulation path. While in the latter, enhancing throughput eventuates in increasing manufacturing costs; for the larger a memory capacity becomes, the higher the manufacturing costs. More precisely, if the digital copier is to copy approximately fifty pages at a time, employing a memory with an adequate capacity increases manufacturing costs inhibitedly for commercialization.

Therefore, a double-side digital copier such that can optimize throughput without increasing manufacturing costs has been sought after.

SUMMARY OF THE INVENTION

Accordingly, the present invention has an object to provide a double-side digital copier such that can optimize throughput without increasing manufacturing costs with the efficient use of two memories and effective feeding of the documents and copy sheets.

The above object is fulfilled by a double-side digital copier that reads images on documents fed into an image reading unit in accordance with a predetermined cycle based on copying conditions such as the number of copies and single/double-side copying, and the number of documents and copy sheets temporarily maintained in the respective circulation paths. Accordingly, the image data obtained by that reading are stored into two memories alternately, one of the memories alone, or both of the memories in a predetermined order in accordance with the predetermined cycle, and read out in a corresponding order.

With having two areas in the memory, or having two memories, the manufacturing cost will not increase substantially. Also, overall throughput can be optimize with the controlled documents feeding and copy sheets feeding together with the adequate image data writing and readout into those memories.

BRIEF DESCRIPTION OF THE DRAWINGS

These and other objects, advantages and features of the invention will become apparent from the following description thereof taken in conjugation with the accompanying drawings which illustrate a specific embodiment of the invention. In the drawings:

FIG. 9 is a table explaining the unique document feeding method;

FIG. 10 is another table explaining the unique document feeding method;

FIGS. 21(a)–21(e) contain tables showing the available combination of the modes and the number of copies;

FIGS. 22(a)–22(e) contain other tables showing the available combination of Modes and the number of copies;

FIGS. 23(a) and 23(b) are views explaining the use of memories in Single/Single Mode when the maximum numbers in both the circulation paths have 3's;

FIGS. 24(a)–24(e) are views explaining the use of memories in Single/Double Mode when the maximum numbers in both the circulation paths have 3's;

DESCRIPTION OF THE PREFERRED EMBODIMENTS

Figure 1:
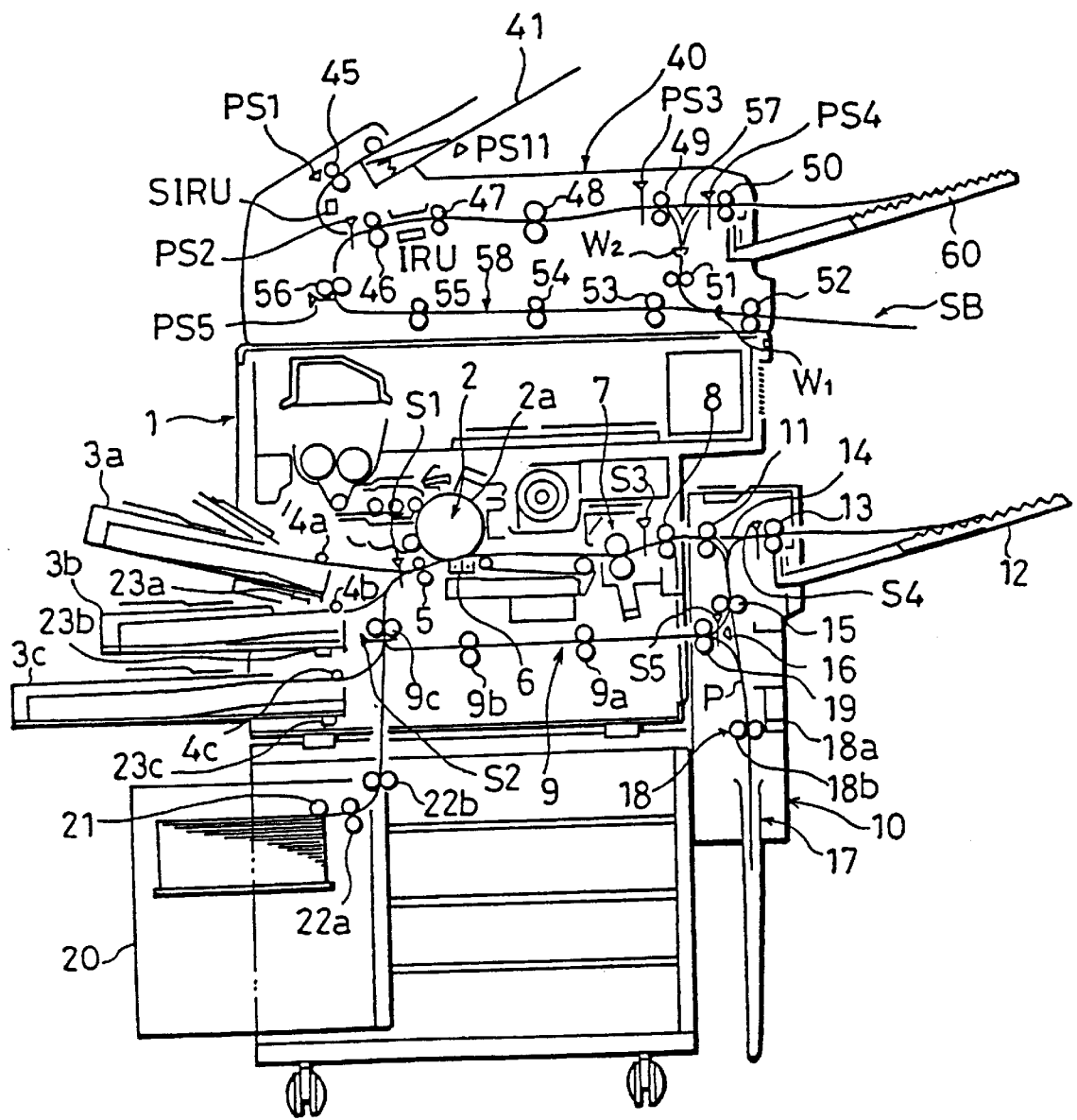
FIG. 1 is a schematic sectional view of the digital copier as an example of the present invention.

The construction of a digital copier as an example of the present invention is described with referring to FIG. 1. The digital copier essentially comprises a printing assembly 1 and a document reading assembly 40.

The printing assembly 1 includes an image forming unit 2 enclosing a photosensitive drum 2a, an electrostatic charger, an optical exposing system, a developer, a transfer charger, a drum cleaner, an image transfer station 6 formed between the photosensitive drum 2a and the transfer charger for transferring an image from the photosensitive drum 2a onto a copy sheet, an image fix station 7 for fixing the image on the copy sheet, and a discharge roller 8 for discharging the copy sheet into a duplex unit 10 attached thereto. Cassettes 3a, 3b, and 3c, each containing a number of copy sheets in different size, are attached to an opposing side to the duplex unit 10, and feeding rollers a, 4b, and 4c, are respectively attached to the cassettes 3a, 3b, and 3c for feeding a copy sheet to the transfer station 6 by means of a pair of register rollers 5 (hereinafter, simply referred to as the register roller 5). As well, copy size detectors 23a, 23b, and 23c consisting of instruments such as micro-switches are respectively attached to the cassettes 3a, 3b, and 3c for detecting a copy sheet size and a feeding direction—lengthwise or crosswise; the art related to the copy size detection is disclosed in Japanese Laid-open Patent Application No. 63-70865 filed by the same applicant of the present invention. Underneath the printing assembly 1, a copy sheet circulation path 9 (the circulation path 9) is formed with three pairs of rollers 9a, 9b, and 9c for transporting the copy sheet from the duplex unit 10 to the register roller 5. The duplex unit 10 includes a pair of feeding rollers 11 (the feeding roller 11) for feeding the copy sheet from the image forming unit 2 into the duplex unit 10, a pair of discharge rollers 13 (the discharge roller 13) for discharging the copy sheet onto a catch tray 12, a first switching claw 14 formed between the feeding roller 11 and the discharge roller 13 for selectively guiding the copy sheet onto the catch tray 12 or to a second switching claw 16 which selectively guides the copy sheet into a switch back path 17 or the circulation path 9 by means of a pair of bidirectional rollers 15 (the bidirectional roller 15), a bidirectional roller 18 consisting of a driving roller 18a and a slave roller 18b, and a pair of transport rollers 19 (the transport roller 19) formed at the mouth of the circulation path 9. The printing assembly 1 additionally includes an optional cassette 20, a feeding roller 21 and two pairs of forwarding rollers 22a and 22b for feeding a copy sheet into the register roller 5.

Also, the printing assembly 1 includes five sensors, S1–S5: S1 is placed in the upper stream of the register roller 5 for detecting a copy sheet being fed thereinto; S2 is placed in the upper stream of the roller 9c for detecting a copy sheet being fed into the register roller 5 from the circulation path 9; S3 is placed in the upper stream of the discharge roller 8 for detecting a copy sheet being fed into the duplex unit 10; S4 is placed in the upper stream of the discharge roller 13 for detecting a copy sheet being discharged onto the catch tray 12; S5 is placed in the upper stream of the transport roller 19 for detecting a copy sheet being fed into the circulation path 9. A capital letter P in the drawing denotes a point of reversion.

The printing assembly 1 constructed as above operates in the following way.

In case of Single-side copy, the printing assembly 1 is set in Single-side Mode with a panel controller which will be depicted later. Then the first switching claw 14 is set in a position to discharge a copy sheet coming into the duplex unit 10 onto the catch tray 12. As well, a desirable copy sheet size is selected so that a copy sheet of that size is fed into the transferring station 6 from the corresponding cassette by means of the register roller 5 synchronously with the image forming unit 2. Under these conditions, a toner image on the photosensitive drum 2a is transferred onto the front side of the copy sheet at the image transfer station 6, and fixed thereon at the image fix station 7. Accordingly, with the switching claw 14, the copy sheet is discharged into the duplex unit 10 and further onto the catch tray 12 with its front side upward.

On the other hand, in case of Double-side copy, the printing assembly 1 is set in Double-side Mode. Then, the first switching claw 14 is set in a position to guide a copy sheet coming into the duplex unit 10 to the second switching claw 16, while the second switching claw 16 is set in a position to guide the copy sheet into the switch back path 17 and further into the circulation path 9. Under these conditions, the copy sheet transported to the feed roller 11 with its front side upward is guided to the second switching claw 16 by the first switching claw 14, and when the bottom end of the copy sheet reaches P, the bidirectional roller 18 starts to rotate reversely. Thus, the sheet is guided into the circulation path 9 by the transport roller 19, and fed into the register roller 5 again. Accordingly, a toner image on the photosensitive drum 2a is transferred on the back side thereof at the image transfer station 6 and fixed thereon at the image fix station 7. Subsequently, the copy sheet is discharged onto the catch tray 12 with its front side downward by means of the transport roller 8, feed roller 11, first switching claw 14, and discharge roller 13.

When a plurality of copies are made in this mode, several copy sheets are temporarily kept in the circulation path 9, so that the images are steadily transferred onto the copy sheets, enabling successive image forming per a number of copy sheets.

FIGS. 2(a)–2(e) explain how a plurality of copies are made in Double/Double mode. FIGS. 2(a)–2(e) represent time sequence, i.e., FIG. 2(a)→FIG. 2(b)→FIG. 2(c)→FIG. 2(d)→FIG. 2(e). In FIGS. 2(a)–2(e), the letter a denotes the feeding path, while the letter b denotes the circulation path 9; $P_i$ denotes a copy sheet (where i is a serial number thereof) and the $P_i$ denotes copy sheets (where i is a serial number thereof) and the numbers in ∩ attached thereon does the serial number of the documents; the front sides of the documents are given odd numbers and the back sides are given even numbers serially. In this example, up to four sheets can be maintained in both the paths a and b, and the copy sheet $P_i$ circulates in the direction of the arrows.

Figure 2A:
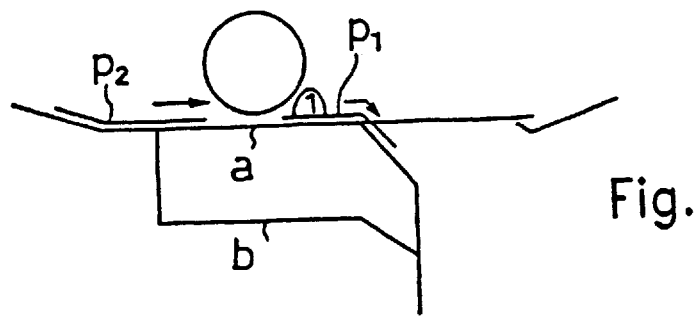
FIGS. 2(a)–2(e) are views explaining successive double-side copying.

In FIG. 2(a), the image on Document 1 has been transferred onto the front side of copy sheet P1, while the following copy sheet P2 is being fed into feeding path a.

Figure 2B:
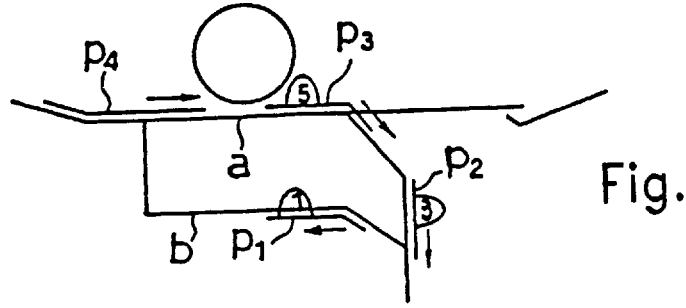

In FIG. 2(b), the images on Document 3 and Document 5 have been respectively transferred onto the front sides of copy sheets P2 and P3, while the following copy sheet P4 is being fed to feeding path a. Copy sheets P1 and P2 are being transported through circulation path b; the former is reversed, while the latter is not.

Figure 2C:
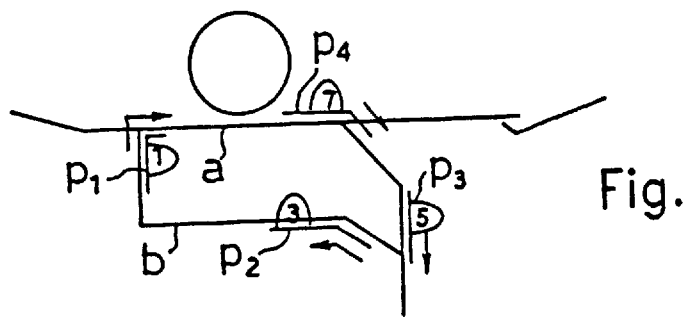

In FIG. 2(c), the image on Document 7 has been transferred onto the front side of copy sheet P4, and the copy sheet P1 is being fed into feeding path a again. Copy sheets P2 and P3 are being transported through circulation path b; the former is reversed, while the latter is not.

Figure 2D:
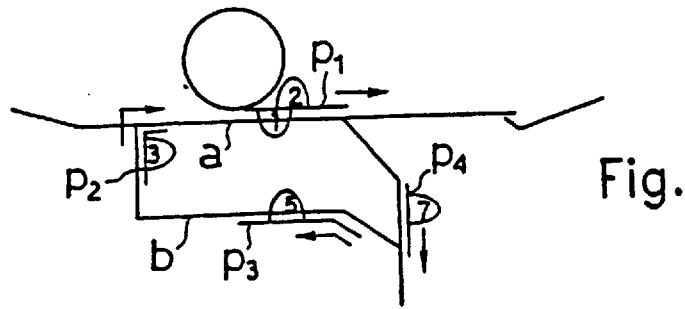

In FIG. 2(d), the image on Document 2 has been transferred onto the back side of copy sheet P1 which is to be discharged in the direction of the arrows, and the copy sheet P2 is being fed into the feeding path a again. The copy sheets P3 and P4 are being transported through the circulation path b; the former is reversed, while the latter is not.

Figure 2E:
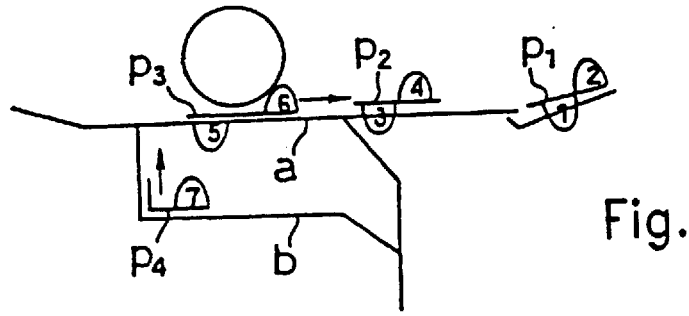

In FIG. 2(e), the copy sheet P1, with the image of Document 1 on the front side and that of Document 2 on the back side, is discharged onto the catch tray with the front side being downward. The image of Document 4 has been transferred onto the back side of copy sheet P2, which is to be discharged in the direction of the horizontal arrow. The image of Document 6 is being transferred onto the back side of the copy sheet P3, and the copy sheet P4 is being transported through the circulation path b.

The feeding of copy sheet P5 and subsequent copy sheets is suspended during the above operation, and the feeding is resumed when the image of Document 8 has been transferred onto the back side of copy sheet P4.

Figure 3:
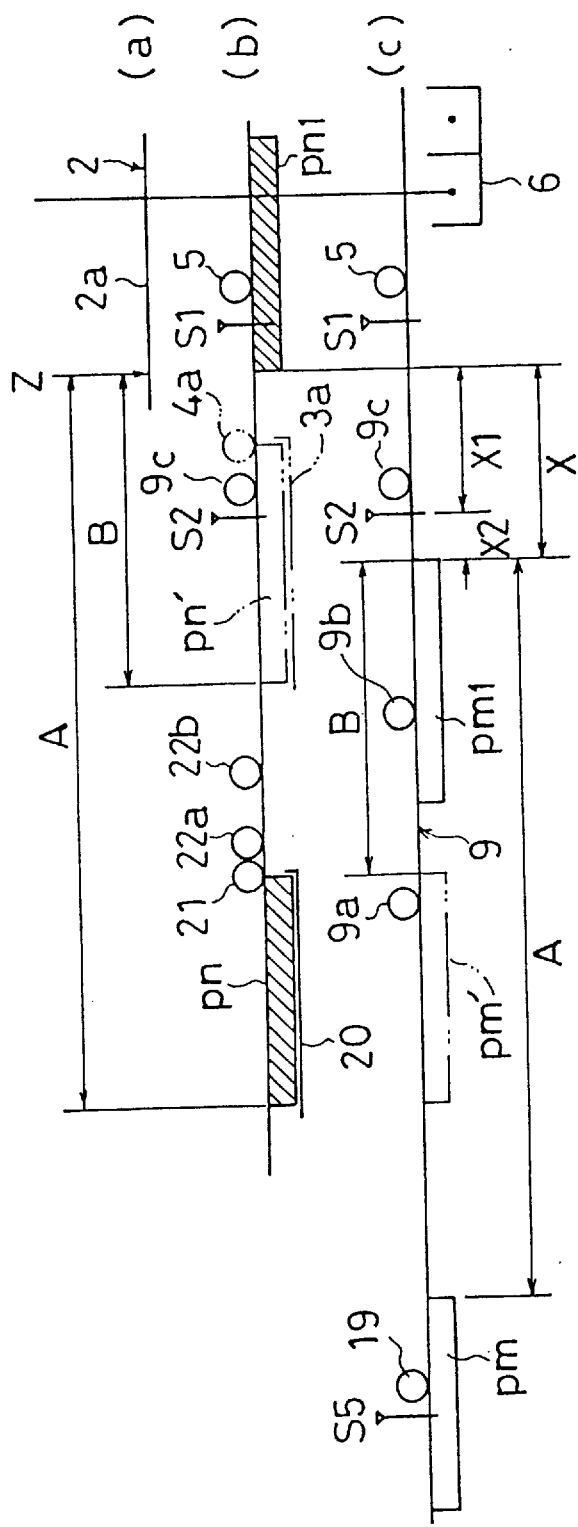
FIG. 3 is a view explaining the location of a copy sheet being fed from the cassette and a copy sheet coming into the copy sheet circulation path.

Incidentally, the printing assembly 1 operates in such a manner that it prevents overlapping of copy sheets from any of the cassettes in the circulation path 9, and overlapping of image exposures on the photosensitive drum 2a, the detail of which is explained by referring to FIG. 3. In the drawing, JIS (Japanese Industrial Standard) A-4 copy sheets are used as the copy sheets in the optional cassette 20; pn is one of the copy sheets fed from the cassette 20, and pm is an initial copy sheet guided into the circulation path 9; line (a) represents the circumference of the photosensitive drum 2a; line (b) represents a pn's route from the optional cassette 20 to the transferring station 6; line (c) represents & pm's route from the transport roller 19 to the transferring station 6 through the circulation path 9; a capital letter Z denotes a point at which an image for pn is exposed on the photosensitive drum 2a.

The printing assembly 1 is preset to feed the copy sheets from the optional cassette 20 with a certain interval; when the copy sheet reaches the transport roller 19, the following copy sheet reaches the driving roller 18a. Although the roller 18a may start to rotate in the right direction for guiding the following copy sheet into the switch back path 17 while the copy sheet is still nipped by the bidirectional roller 18, the copy sheet is duly transported into the circulation path 9 because the transport roller 19 has a larger power than the driving roller 18a. Also, it is preset to start the feeding of copy sheets from the cassette when S5 detects the top end of the copy sheet, and to start exposure in a certain latency since S2 detects the top end thereof. As a result, pn is advanced to pn1 at the time of exposure denoted by Z, and pm is accordingly advanced to pm1, both maintaining the same interval A. As well, the printing assembly 1 is preset to advance the copy sheet to pm's location in a certain latency since S3 detects the top end thereof, and the certain latency depends on the copy sheet size.

Under these conditions, pm1 and pn1 must maintain at least a distance X1, or a distance from S2 to Z, to prevent overlapping of exposure; to ensure safety, it is preferable to add a distance X2 to make the total distance X1+X2=X. X must be larger than the minimum tolerance interval, but it can be smaller than the feeding interval; for the copy sheets will not be transported into the circulation path 9 more than once.

Figure 4:
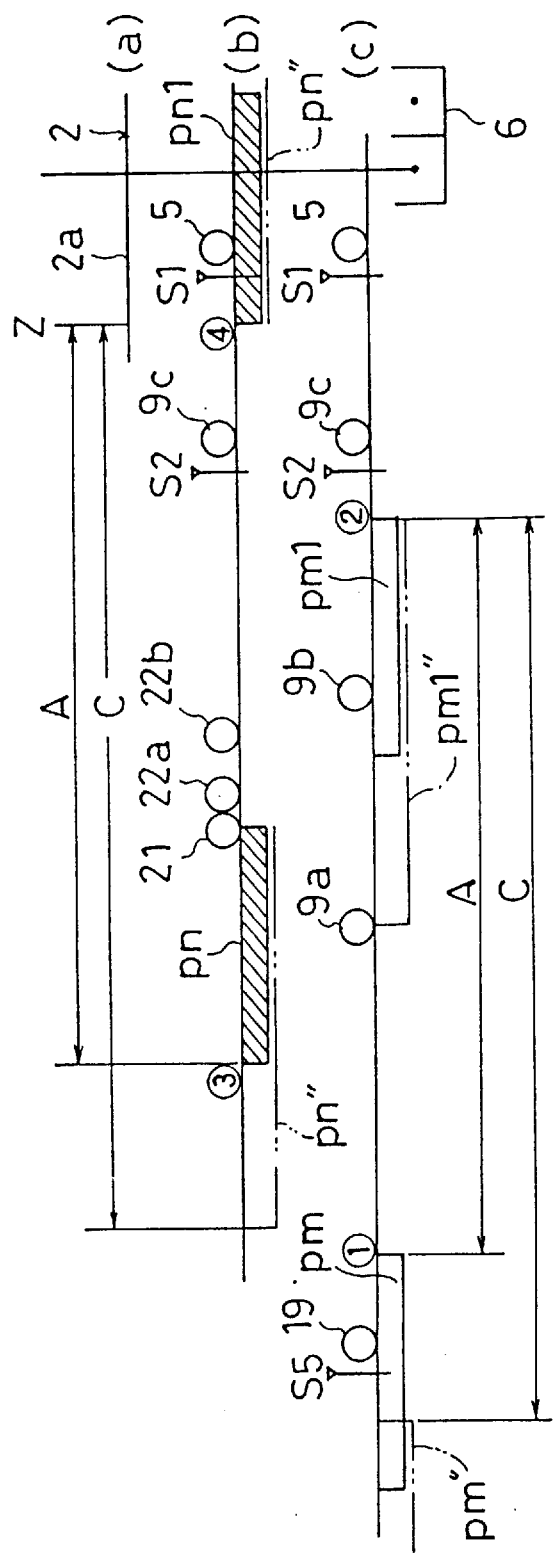
FIG. 4 is another view explaining the location of a copy sheet being fed from the cassette and a copy sheet coming into the copy sheet circulation path.

Although the interval A depends on the location of the cassettes and the copy sheet sizes, it can be correspondingly varied in accordance with the copying conditions. For example, when pn' in the cassette 3c (drawn in a virtual line) is used, the interval is shortened to the interval B. Likewise, when a larger copy sheet pn" is fed from the optional cassette 20 as is shown in FIG. 4, the interval is prolonged to the interval C.

The other essential component, the document reading assembly 40, encloses an image reading unit IRU including image reading elements such as a CCD(Charge Coupled Device), a pair of feed rollers 45 (the feed roller 45) and a pair of register rollers 46 (the register roller 46) formed in the upper stream of IRU, two pairs of rollers 47 and 48 and a feed roller 49 formed in the lower stream thereof, a discharge roller 50 formed at an opening facing toward a catch tray 60, a switching claw 57 formed between the feed roller 49 and the discharge roller 50, and a pair of transport rollers 51 (the transport roller 51), a pair of bidirectional rollers 52 (the bidirectional roller 52), a switch back unit (SB), a document circulation path 58 (the circulation path 58) formed in the lower stream of the switching claw 57, and four pairs of rollers 53, 54, 55, and 56 formed in the circulation path 58.

Also, a document tray 41 and the catch tray 60 are attached to the image reading assembly 40. In addition, the document reading assembly includes seven sensors, PS1–PS5, PS11 and SIRU : PS11 is placed on the bottom of the document tray 41 for detecting a document thereon; PS1 is placed in the lower stream of the feed roller 45 for detecting a document being fed into SIRU; SIRU is placed in the lower stream of PS1 for detecting an image on the back side of the document; PS2 is placed in the upper stream of the register roller 46 for detecting the document being fed thereinto; PS3 is placed in the upper stream of the feed roller 49 for detecting the document being fed into SB; PS4 is placed in the upper stream of the discharge roller 50 for detecting a document being discharged onto the catch tray 60; PS5 is placed in the upper stream of the transport roller 56 for detecting the side-reversed document being fed into the register roller 46 from the circulation path 58. Both W1 and W2 denote the points of reversion.

The document reading assembly 40 constructed as above operates in the following way.

When only the image on the front side of a document is read, the document reading assembly 40 is set in Single-side Mode. Then the switching claw 57 is set in a position to discharge the document onto the catch tray 60. Under these conditions, the document in the tray 41 is fed into the IRU by the feed roller 45 and the register roller 46 synchronously with the image forming unit 2, and discharged onto the catch tray 60, with its front side being downward, by means of the rollers 47–50 and the switching claw 57.

On the other hand, when the image on the both sides of a document are read, the document reading assembly 40 is set in Double-side Mode. Then, the switching claw 57 is set in a position to guide the document into SB by means of the transport roller 51 and bidirectional roller 52. Under these conditions, the document from IRU is transported into SB with its front side being upward, and when the bottom end of the document reaches W1, the bidirectional roller 52 starts to rotate reversely. Thus, the document is transported into the circulation path 58, and fed to the register roller 46 again, so that IRU reads the image on the back side thereof. Subsequently, the document from IRU is guided into SB again with the switching claw 57 and when the bottom end of the document reaches W2, the transport roller 51 and the bidirectional roller 52 start to rotate reversely, so that the document is discharged onto the catch tray 60, with its front side being downward, by the discharge roller 50.

When a plurality of copies are made in this mode, several documents are kept temporarily in the circulation path 58 to enable successive image reading for a number of documents.

With the above double-side copier, it is obvious that throughput is directly proportional to the number of the copy sheets and documents kept respectively in the circulation path 9 and the circulation path 58. However, there is a limit in these numbers due to various factors besides a limited memory capacity.

Figure 5:
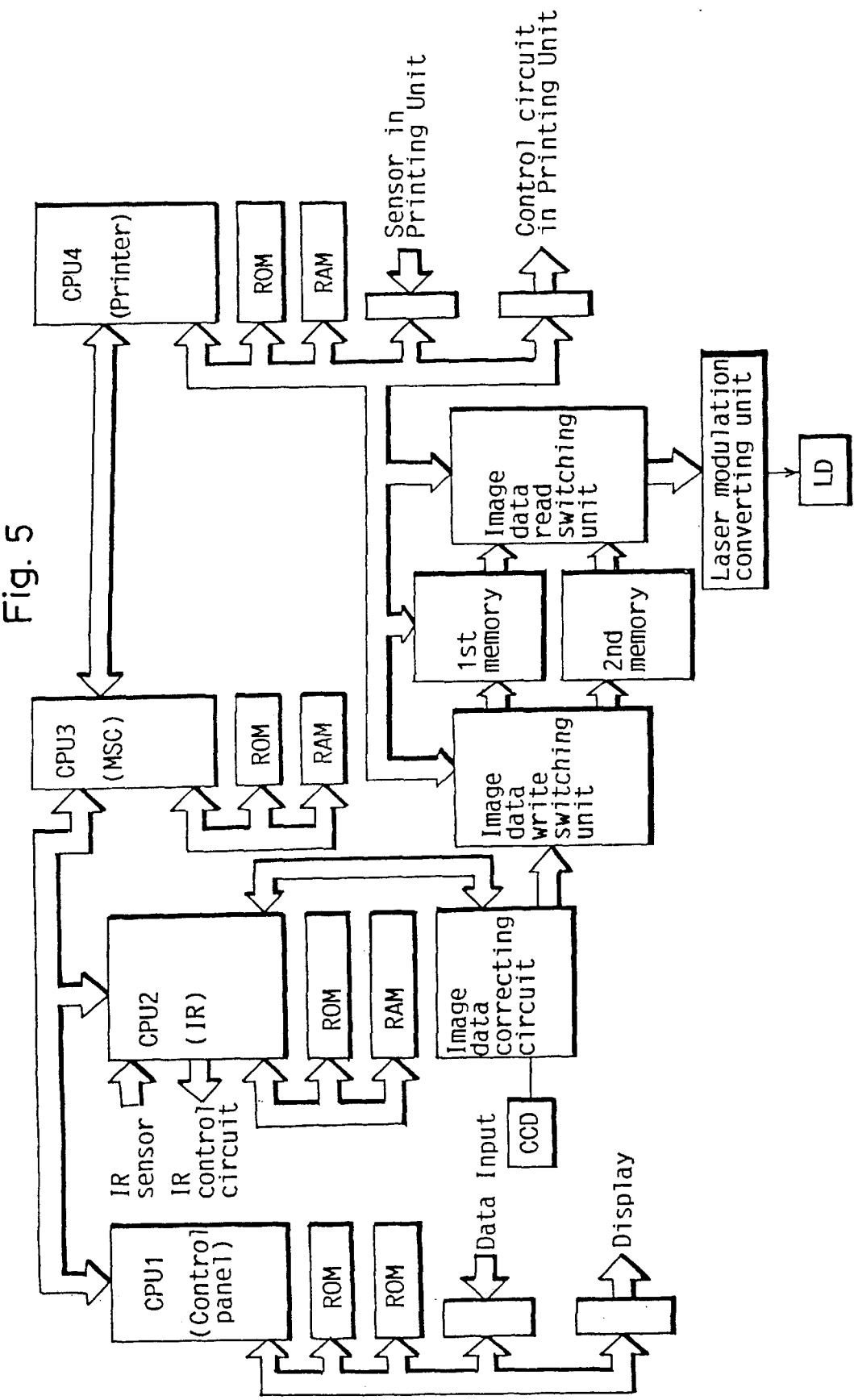
FIG. 5 is a schematic view of the control circuit.

Therefore, in the present invention, efficient image data writing and readout, and effective feeding of the documents and copy sheets are realized under the control of a control circuit, which consists of CPU's 1–4 as is shown in FIG. 5.

CPU1 decodes data related to copying conditions received from a control panel and displays them thereon. CPU2 controls the image reading assembly 40: it controls the document reading, feeding, and image data writing. CPU3 controls the digital copier: it matches the operation timing between the image reading assembly 40 and the printing assembly 1. CPU4 controls the printing assembly 1: it controls the image developing, transferring, fixing and the copy sheet feeding as well as image data readout.

The effects of the present invention can be explained best by explaining the operation of each CPU more in detail.

Figure 6:
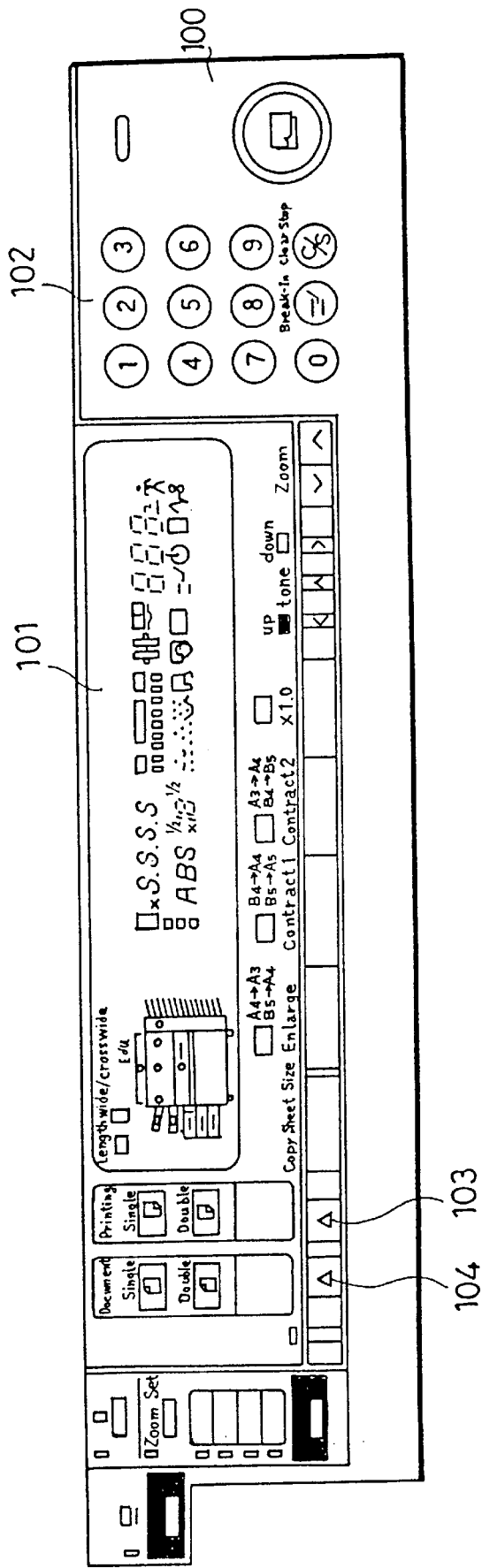
FIG. 6 is a top view of the control panel.

CPU1 receives the data related to the copying conditions through the controller panel. The controller panel consists of an input unit 100 and a display unit 101 as is shown in FIG. 6; the input unit 100 includes a 10-key 102 for setting the number of copies, a printing mode selecting button 103, and an image reading mode selecting button 104; the display unit 101 includes indicators to display the selected copying conditions and warning such as jamming and toner-empty.

Figure 7:
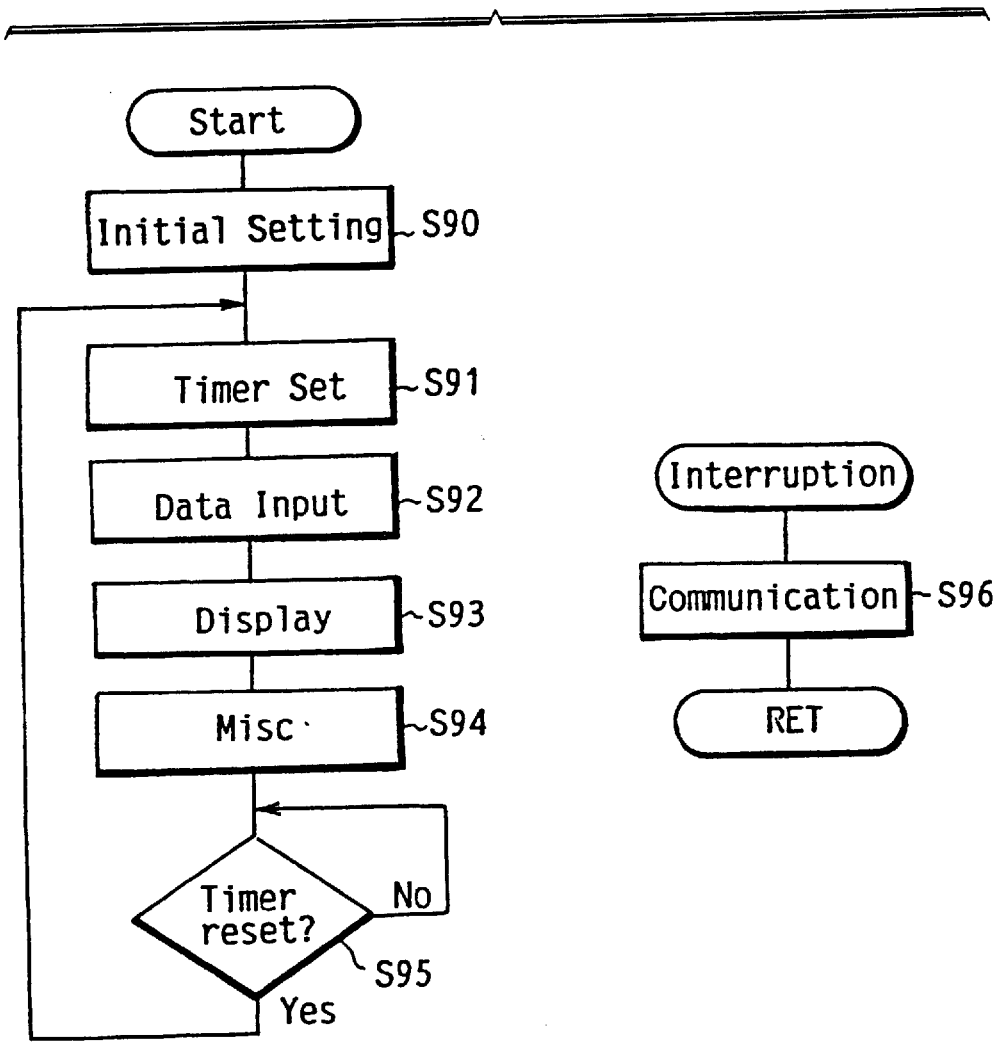
FIG. 7 is a flowchart detailing the operation of CPU1.

A flowchart in FIG. 7 details how CPU1 controls the input data through the controller panel.

In Step S90, the control panel is initialized, and an internal timer is set in Step S91. In Step S92, data as to the copying conditions such as the number of copies, enlargement/reduction ratio, and Single- or Double-side Modes in reading and printing are inputted through the control panel. In Step S93, the display unit 101 displays the above setting conditions, and miscellaneous conditions are checked in Step S94. In Step S95, whether the internal timer is reset or not is detected. If so, the internal timer is set again; otherwise the detection is repeated. Should any failure or change be informed from the other CPU's during the above operation, CPU1 suspends an ongoing operation, and executes an interrupt instruction in Step S96, then resumes the suspended operation.

Although, the data related to the copying conditions are inputted manually through the controller panel, the digital copier can also automatically set these conditions thanks to SIRU and the copy size detectors 23a, 23b, and 23c.

Figure 8:
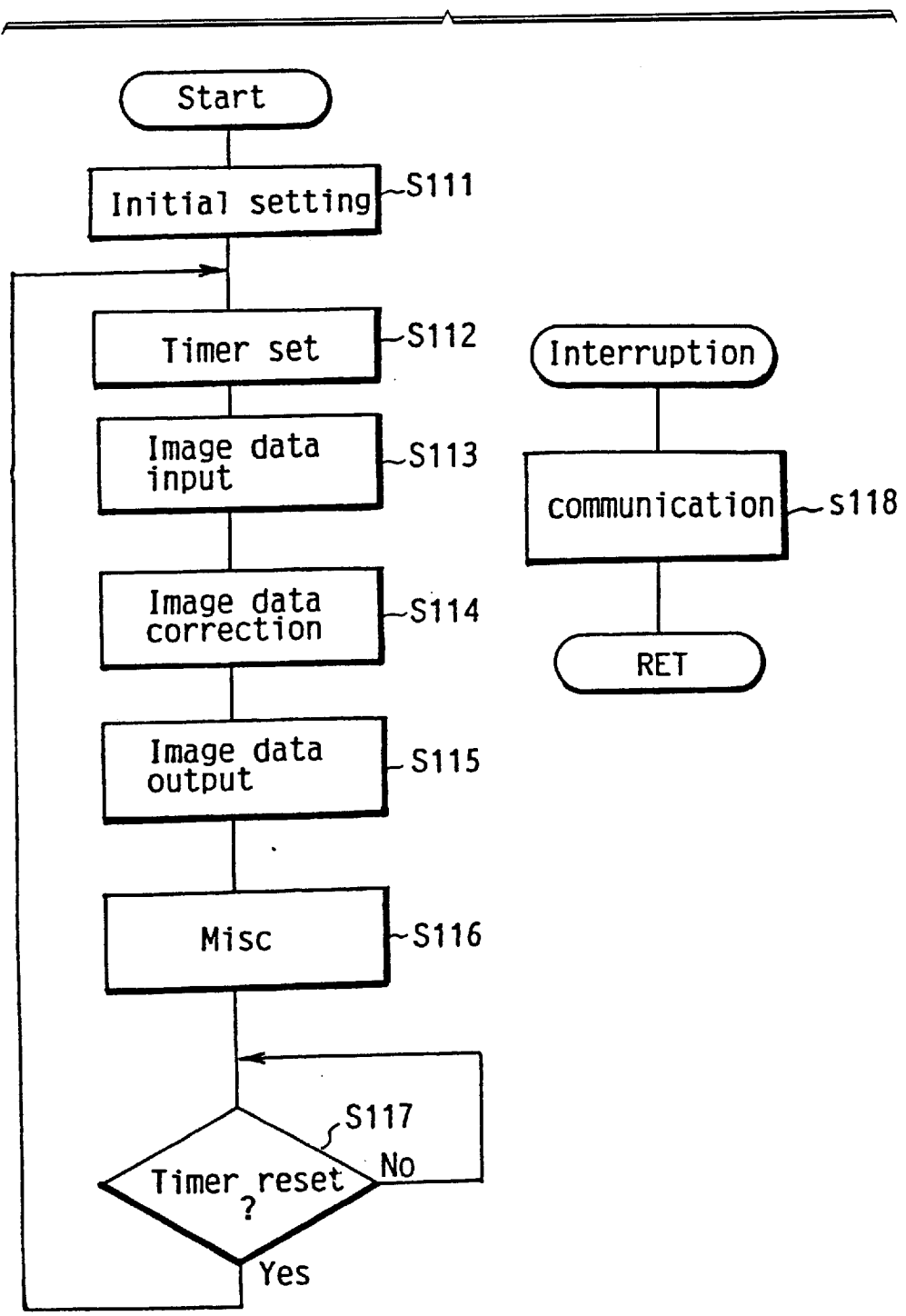
FIG. 8 is a flowchart detailing the operation of CPU2.

On the other hand, CPU2 controls the document reading assembly 40, and a flowchart in FIG. 8 details the method thereof.

In Step S111, the document reading assembly 40 is initialized, and the internal timer is set in Step S112. In step S113, an image is read through a unique document feeding method with three sub-routines, which will be described later. In Step 114, the image data obtained by reading with CCD are outputted into an image correcting unit, in which correction such as shadowing and dithering, as well as enlargement/reduction ratio adjustment are carried out. Subsequently, in Step S115, the image data are outputted into LD(Laser Diode) by means of a laser driving circuit consisting of a memory switching unit for image data writing, another memory switching unit for image data readout, a first memory and a second memory each having a capacity comparable to data amount of one document, and a laser modulation signal converting unit. In Step S116, miscellaneous conditions are checked and whether the internal timer is reset or not is detected in Step S117. If so, the internal timer is set again; otherwise the detection is repeated. Should any failure or change be informed from the other CPU's during the operation as above, CPU2 suspends an ongoing operation, and executes an interrupt instruction in Step S118, then resumes the suspended operation.

FIGS. 9 and 10 depict the unique document feeding method used in Step S113, or namely the gist of the present invention. Hereinafter, let the maximum numbers in both the circulation paths have either 2's or 3's, and the number of copies are simply referred to as the copy number in the drawings for explanation's convenience.

To begin with, the case when both the maximum numbers have 3's is explained by referring to FIG. 9.

In Single/Single Mode, the documents are invariably fed every (the number of copies) documents.

In Single/Double Mode, the documents are fed successively when the number of copies is 1. When the number of copies is 2, the documents are fed in a cycle:

[3 documents are fed—the feeding is suspended for 2 printing*

(*printing means the image forming on the copy sheet).

1 document is fed—the feeding is suspended for 1 printing 1 document is fed—the feeding is suspended for 2 printing 1 document is fed—the feeding is suspended for 1 printing 1 document is fed—the feeding is suspended for 1 printing]

When the number of copies is 3, the documents are fed in a cycle:

[1 document is fed—the feeding is suspended for 2 printing—1 document is fed—the feeding is suspended for 2 printing].

When the number of copies is 4 or more, the number of copies is divided by 3 to find a quotient a and a remainder b.

If b is either 1 or 2, the documents are fed per (the number of copies×6) in a cycle:

[1 document is fed—the feeding is suspended for 2 printing—1 document is fed—the feeding is suspended for (the number of copies×2−b−4) printing—1 document is fed—the feeding is suspended for 2 printing—1 document is fed—the feeding is suspended for ((the number of copies+b )×2−7)) printing—1 document is fed—the feeding is suspended for 2 printing—1 document is fed—the feeding is suspended for (the number of copies×2−b−1) printing].

If b is 0, the documents are fed per (the number of copies×2) in a cycle:

[1 document is fed—the feeding is suspended for 2 printing—1 document is fed—the feeding is suspended for (the number of copies×2−−4) printing].

In Double/Single Mode, the documents are invariably fed every (the number of copies×2) documents.

In Double/Double Mode, when the number of copies is 1, the documents are fed in a cycle:

[3 documents are fed—the feeding is suspended for 3 printing] When the number of copies is 2, the documents are fed in a cycle:

[1 document is fed—the feeding is suspended for 1 printing—1 document is fed—the feeding is suspended for 4 printing—1 document is fed—the feeding is suspended for 4 printing].

When the number of copies is 3 or more, the number of copies is divided by 3 to find a quotient a and a remainder b, and documents are fed every (the number of copies×2−b documents.

FIG. 10 depicts the feeding method when the maximum numbers have 2's.

In Single/Single Mode, documents are invariably fed every (the number of copies) documents.

In Single/Double Mode, when the number of copies is 1, the documents are fed successively. When the number of copies is 2, the documents are fed every two documents. When the number of copies is 3 or more, the number of copies is divided by 2 to find a quotient a and a remainder b, and documents are fed in a cycle:

[1 document is fed—the feeding is suspended for 1 printing—1 document is fed—the feeding is suspended for (the number of copies×2−3−b) printing—1 document is fed—the feeding is suspended for 1 printing—1 document is fed—the feeding is suspended for (the number of copies×2−3+b) printing].

In Double/Single Mode, when the number of copies is 1, the documents are fed in a cycle:

[2 documents are fed—the feeding is suspended for 2 printing] When the number of copies has 2 or more, the documents are invariably fed every (the number of copies×2) documents.

In Double/Double Mode, when the number of copies is 1, the documents are fed in a cycle:

[2 documents are fed—the feeding is suspended for 2 printing] When the number of copies is 2, the documents are fed every (the number of copies×2) documents. When the number of copies is 3 or more, the number of copies is divided by 2 to find a quotient a and a remainder b, and the documents are fed in a cycle:

[1 document is fed—the feeding is suspended for (the number of copies×2−1−b) printing—1 document is fed—the feeding is suspended for (the number of times×2−1+b) printing].

Figure 11:
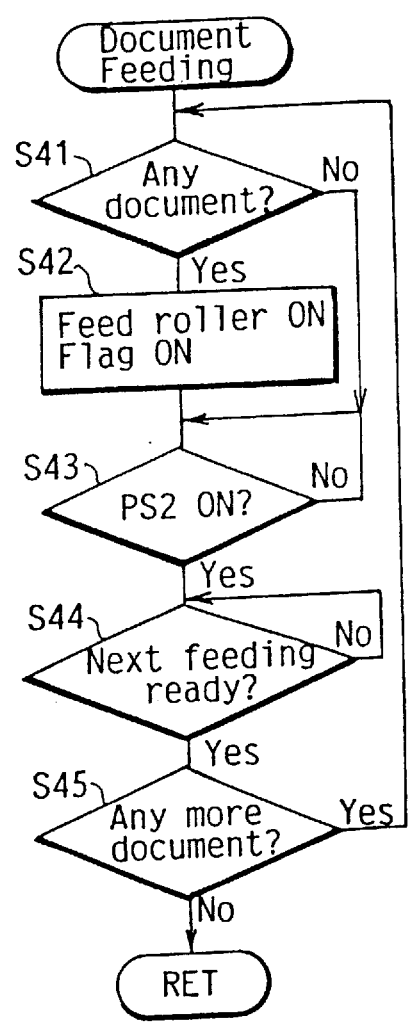
FIG. 11 is a flowchart detailing the document feeding.
Figure 12:
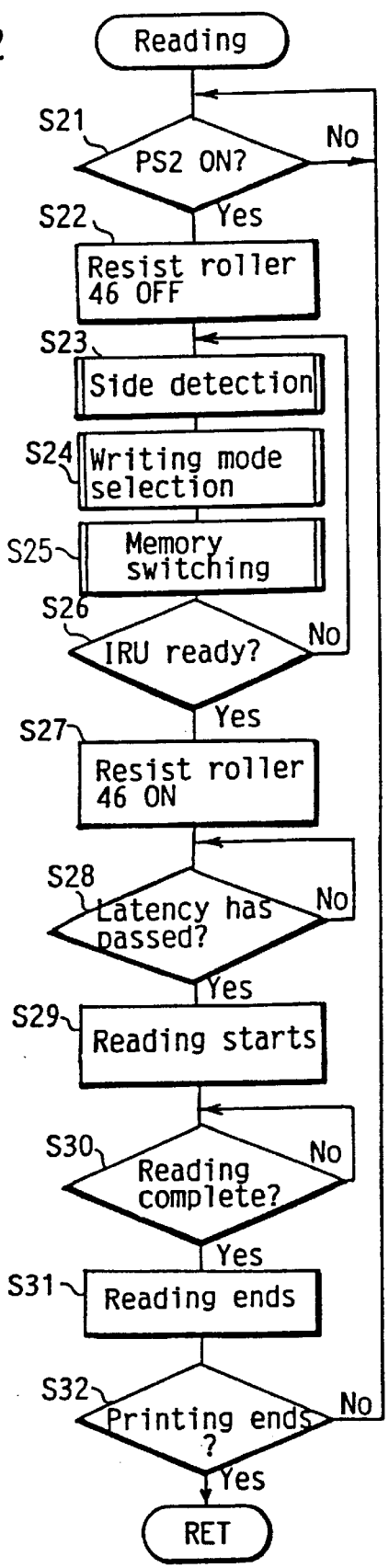
FIG. 12 is a flowchart detailing the image reading.
Figure 13:
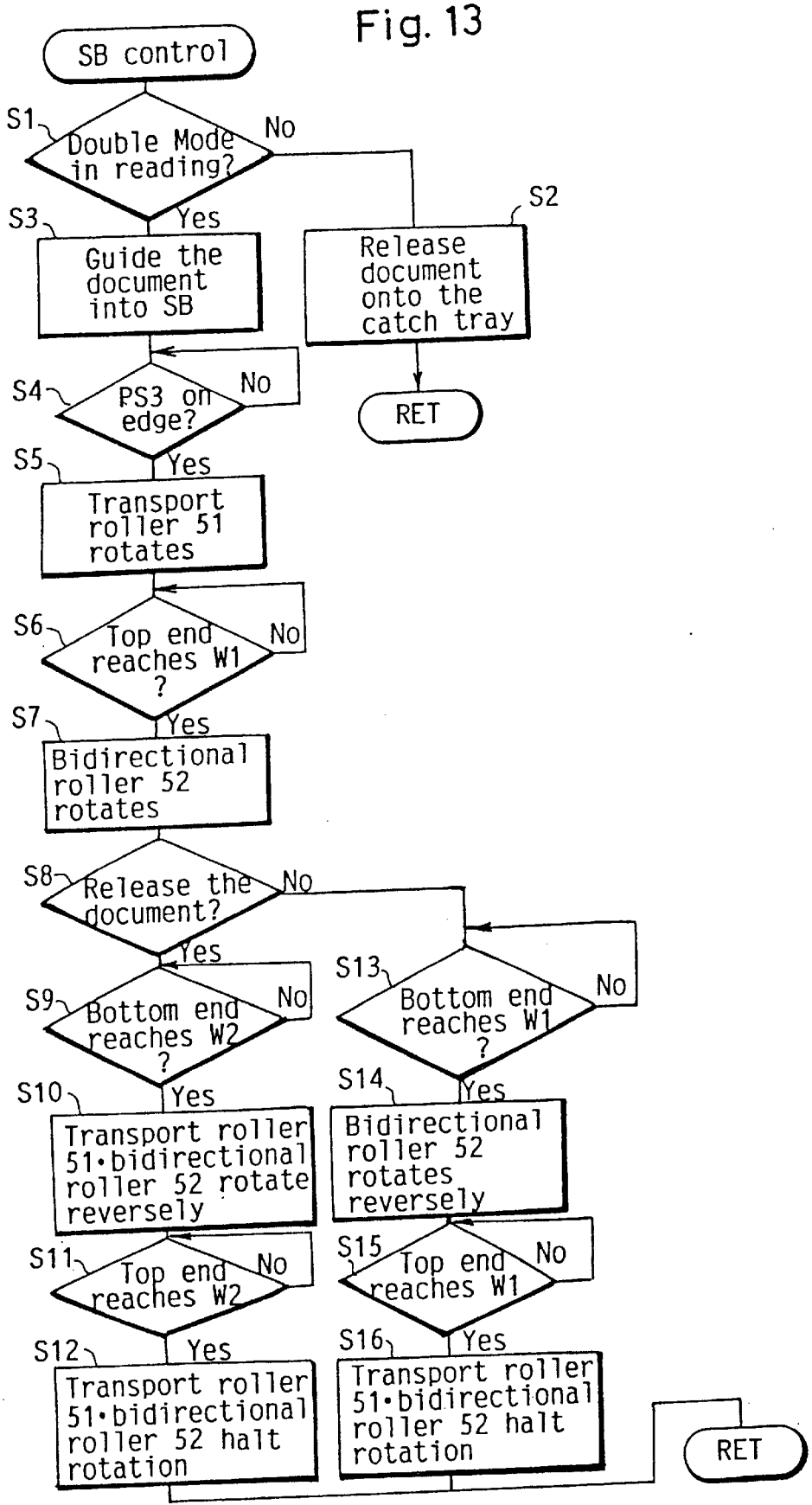
FIG. 13 is a flowchart detailing the operation at switch back unit.

Accordingly, with exploiting the above unique feeding method, the images on documents are read as is detailed by the flowcharts in FIGS. 11–13.

In Step S41 in FIG. 11, an appropriate cycle of the feeding, which was explained with referring to FIGS. 9 and 10, is selected in accordance with the selected copying conditions. Subsequently, the feed roller 45 starts to rotate and a flag is set so as to indicate that a first page is being fed in Step S42; otherwise Step S43 is immediately carried out. In Step S43, whether PS2 is turned on or not is detected, and in a certain latency since the detection, whether the next page can be fed or not is detected in Step S44. Lastly, whether there is any other document to be fed or not is detected in Step S45, and if not, the sub-routine is terminated.

Accordingly in Step S21 in FIG. 12, whether PS2 is turned on or not is detected, and the register roller 46 halts its rotation in Step S22. Subsequently, the side of the document is detected in Step S23, an image data writing mode is selected in Step S24, and the memories are switched for the selected image data writing in Step S25; the Steps S23–S25 have also sub-routines which will be explained later.

In Step S26, whether IRU is ready or not is detected, and the register roller 46 resumes its rotation in Step S27; otherwise Steps S23–S25 are repeated. In Step S28, whether a predetermined latency has passed or not in an IRU circuit is confirmed, and IRU starts reading of the document in Step S29. In Step S30, the entire area to be read has been covered by IRU or not is detected, and IRU halts the reading in Step S31. In Step S32, whether the image has been transferred onto a copy sheet in the printing assembly 1 or not is confirmed, and if so, the sub-routine is terminated.

Correspondingly in Step S1 in FIG. 13, whether Double-side Mode is set in reading or not is detected. If not, the switching claw 57 is set so as to discharge a document onto the catch tray 60 in Step S2 and the sub-routine is terminated; otherwise the switching claw 57 is set in a position to guide the document into SB in Step S3, and PS3 detects whether the top end of the document has reached the detection point or not in Step S4. Then, the transport roller 51 starts to rotate in a proper direction in Step S5, and whether the top end of the document has reached W1 or not is detected in Step S6. Accordingly, the bidirectional roller 52 starts to rotate in a proper direction in Step S7, and whether the document is to be discharged or not is detected in Step S8. When it is to be discharged, whether the end of the document has reached W2 or not is detected in Step S9, and the transport roller 51 and bidirectional roller 52 start to rotate reversely in Step S10. In Step S11, whether the bottom top end of the document has reached to W2 or not is detected. Accordingly, these rollers 51 and 52 halt their rotation in Step S12, and the sub-routine is terminated.

On the other hand, when the document is to be transported into SB, whether the bottom end of the document has reached to W1 or not is detected in Step S13, and the forwarding roller 52 starts to rotate reversely in Step S14. In Step S15, whether the top end of the document has reached W1 or not is detected. Accordingly, these rollers 51 and 52 halt their rotation in Step S16, and the sub-routine is terminated.

Figure 14:
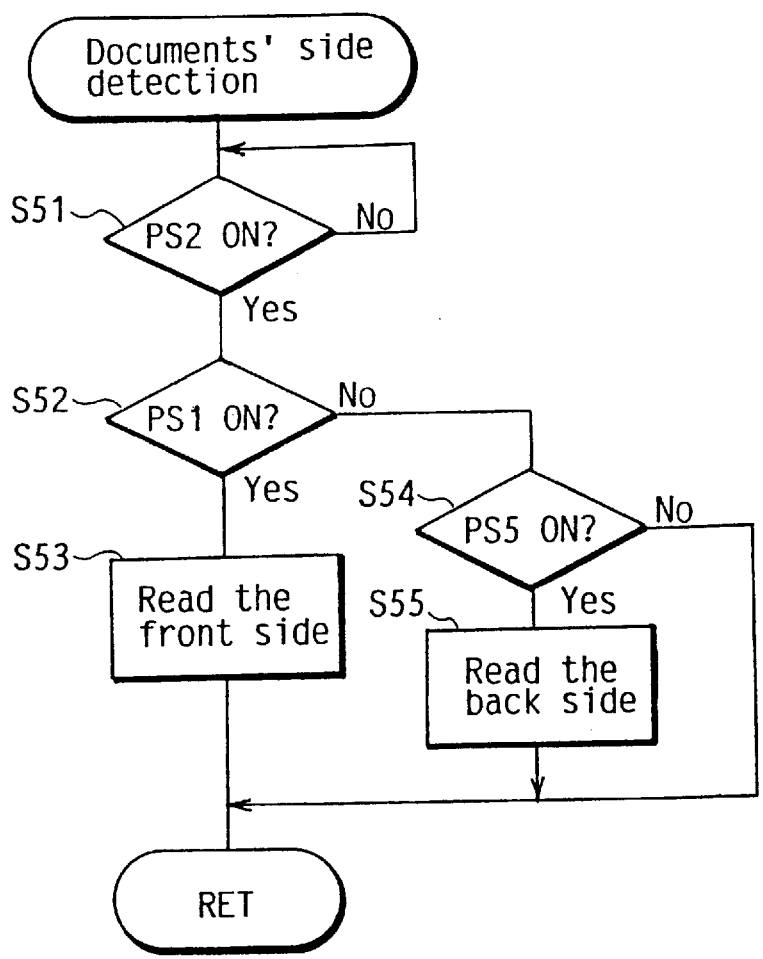
FIG. 14 is a flowchart detailing the detection of the document sides.

Further, the sub-routines of Steps S23–S24 are also explained in the following with referring to, FIG. 14–16, respectively.

In Step S51 in FIG. 14, whether PS2 is turned on or not is detected, and subsequently whether PS1 is turned on or not is detected in Step S52. Then, either the image on the front side of the document is read in Step S53 and the sub-routine is terminated, or whether PS5 is turned on or not is detected in Step S54, so that the image on the back side of the document is read in Step S55 and the sub-routine is terminated.

Figure 15:
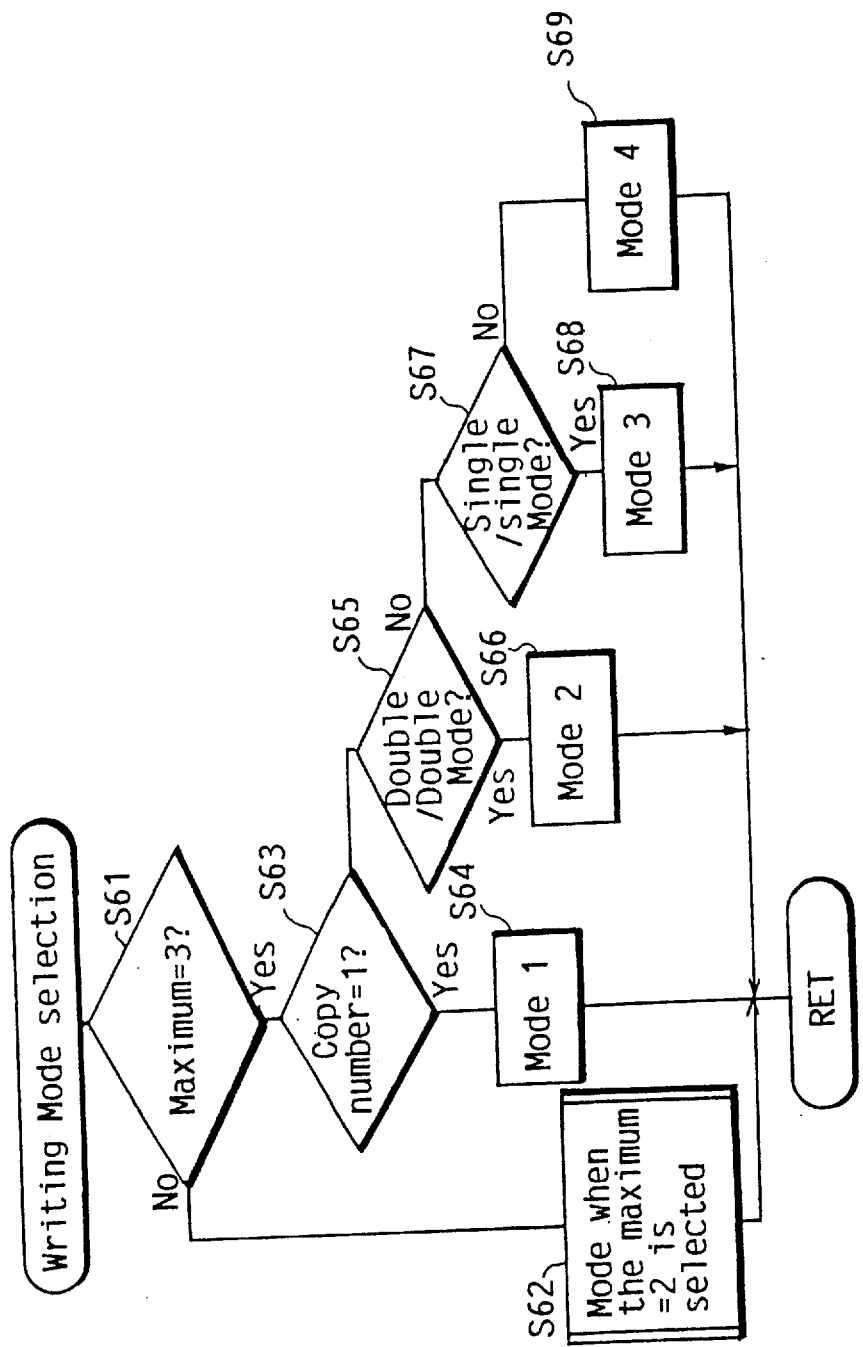
FIG. 15 is a flowchart detailing the image data writing mode selection.

In Step S61 in FIG. 15, whether the maximum numbers have 3's or not is detected. If not, a sub-routine for the maximum numbers of 2's is carried out in Step S62, although the detailed explanation is omitted herein. Otherwise, whether the number of copies is 1 or not is detected in Step S63, and either the image data are written into each memory successively for two times in turn in Step S64 (this writing method is referred to as Mode 1), or whether Double/Double Mode is set or not is checked in Step S65. Then, either the image data for the front side are written into one of the memories and those for the back side into the other in Step S66 (Mode 2), or whether Single/Single Mode is set or not is detected in Step S67. Then, either the image data are written into one of the memories alone in Step S68 (Mode 3)—let the first memory be selected for the explanation's convenience, or the image data are written into both the memories alternately in Step S69 (Mode 4).

In this way, an appropriate writing mode is selected in accordance with the selected side-mode and the number of copies.

Figure 16:
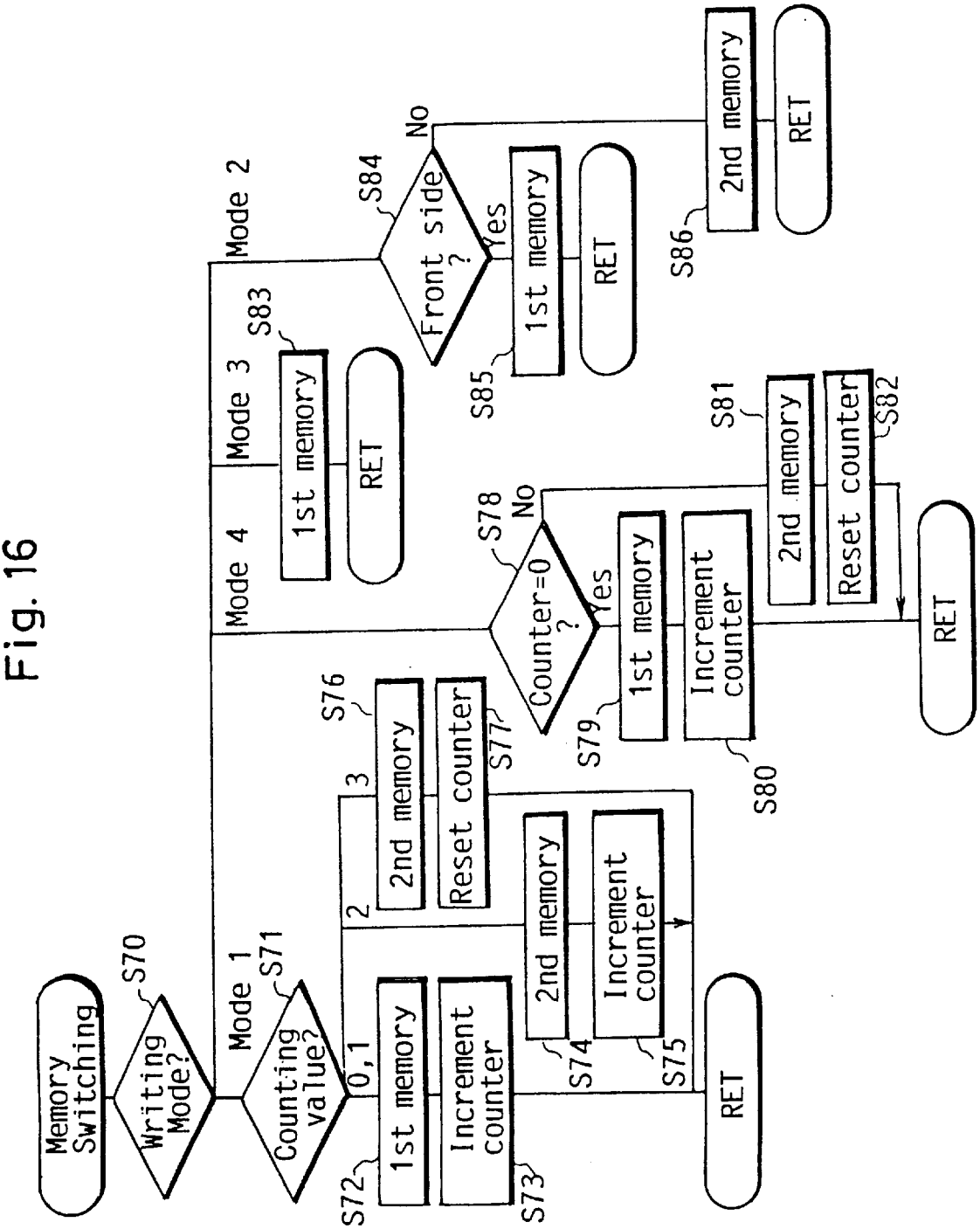
FIG. 16 is a flowchart detailing the memory switching for the image data writing.

Correspondingly, to switch to the appropriate memory, the selected image writing mode is checked in Step S70 in FIG. 16.

If it is Mode 1, the counting value of a memory counter attached to each memory is checked to find how many times the image data are written thereinto in Step S71. When the counting value is either 0 or 1, the first memory is selected in Step S72 and the counter thereof is incremented in Step S73; when it is 2, the second memory is selected in Step S74 and the counter thereof is incremented in Step S75; when it is 3, the second memory is selected in Step S76 and the counter thereof is reset in Step S77. It should be noted that the switching to the appropriate memory is carried out by a signal sent to the image data writing switching unit in the laser driving circuit from the image data correcting circuit.

In case that Mode 4 is selected, whether the counter is 0 or not is checked in Step S78. Then, either the first memory is selected in Step S79 and the counter thereof is incremented in Step S80, or the second memory is selected in Step S81 and the counter thereof is reset in Step S82.

In case that Mode 3 is selected, the first memory is invariably selected in Step S83.

In case that Mode 2 is selected, whether the image data is of the front side of the document or not is detected in Step S84. Then, either the first memory is selected in Step S85, or the second memory is selected in Step S86.

Figure 17:
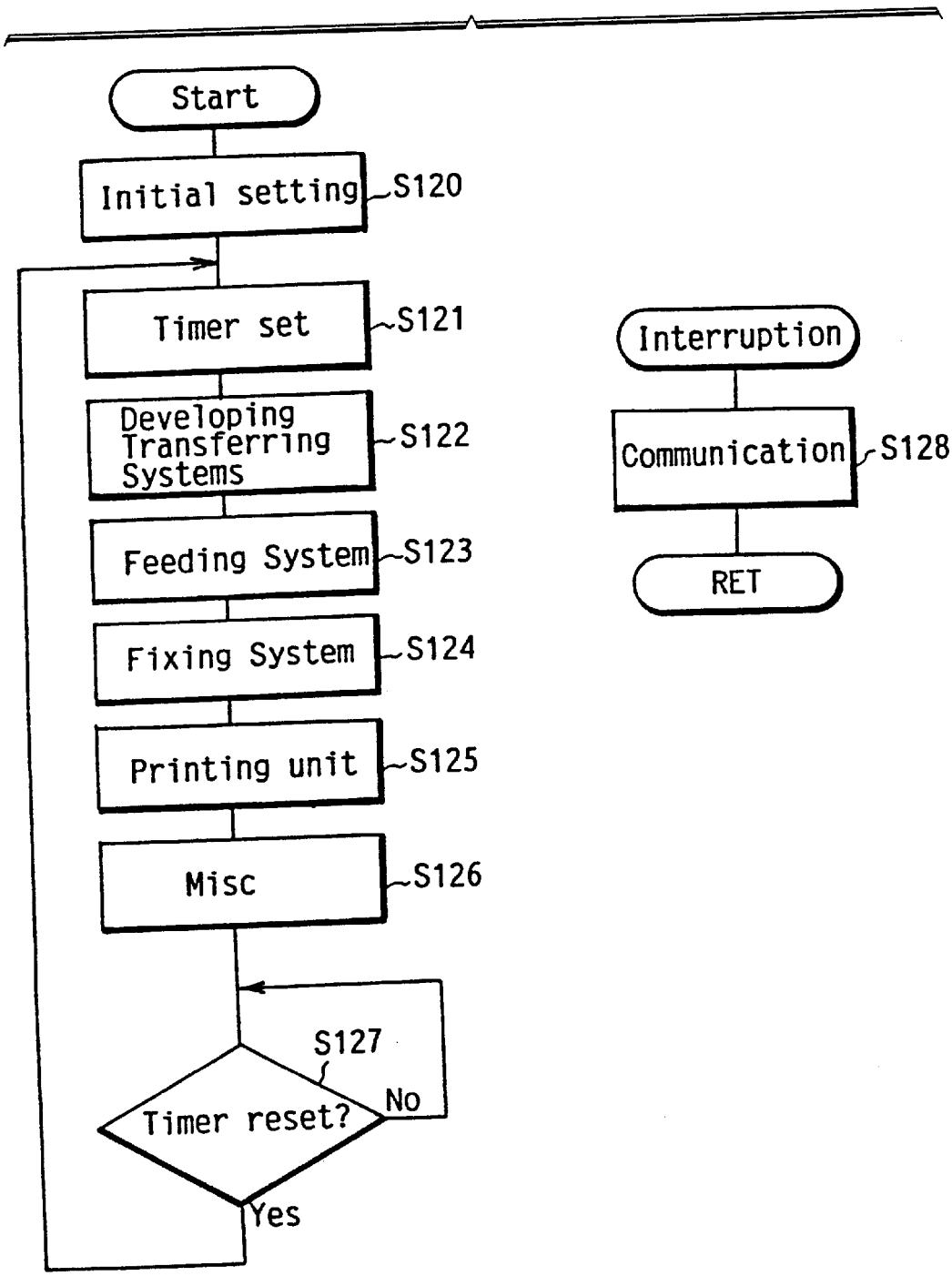
FIG. 17 is a flowchart detailing the operation of CPU4.

The flowchart in FIG. 17 details how CPU4 controls the printing assembly 1.

In Step S120, the printing assembly 1 is initialized, and the internal timer is set in Step S121. In Step S122, the operation of the developing and transferring systems are controlled: electrostatic charger charges the surface of the photosensitive drum 2a evenly as it rotates to form a latent image through exposure with an irradiation of laser beam; the latent image is turned into a toner image with application of a bias voltage to the developer; the toner image is transferred onto the copy sheet. In Step S123, the operation of the feeding system is controlled: a copy sheet is fed from the cassette, the top end of the toner image and that of the copy sheet are matched by a timing roller, and the copy sheet is released to the image fix station 7. In Step S124, the operation of the fixing system is controlled: the toner image is fixed thereon by thermocompression bonding on the copy sheet while the temperature of a fixing roller is regulated, and the copy sheet is discharged to either on the catch tray 12 or the switch back path 17. In Step S125, the operation of the printing assembly 1 is controlled through two sub-routines: a signal is sent to the image data read switching unit in the laser driving circuit to select an appropriate memory, so that the timing of copy sheet feeding and image data readout are matched, which will be described more in detail later. In Step S126, miscellaneous conditions such as failure in printing operation are checked. In Step S127, whether the internal timer is reset or not is detected. If so, the internal timer is set again; otherwise, the detection is repeated. Should any failure be informed from the other CPU's during the operation as above, CPU4 suspends an ongoing operation, and executes an interrupt instruction in Step S128, then resumes the suspended operation.

The two sub-routines in Step S125 are described in the following for further explanation with referring to FIGS. 18 and 19.

Figure 18:
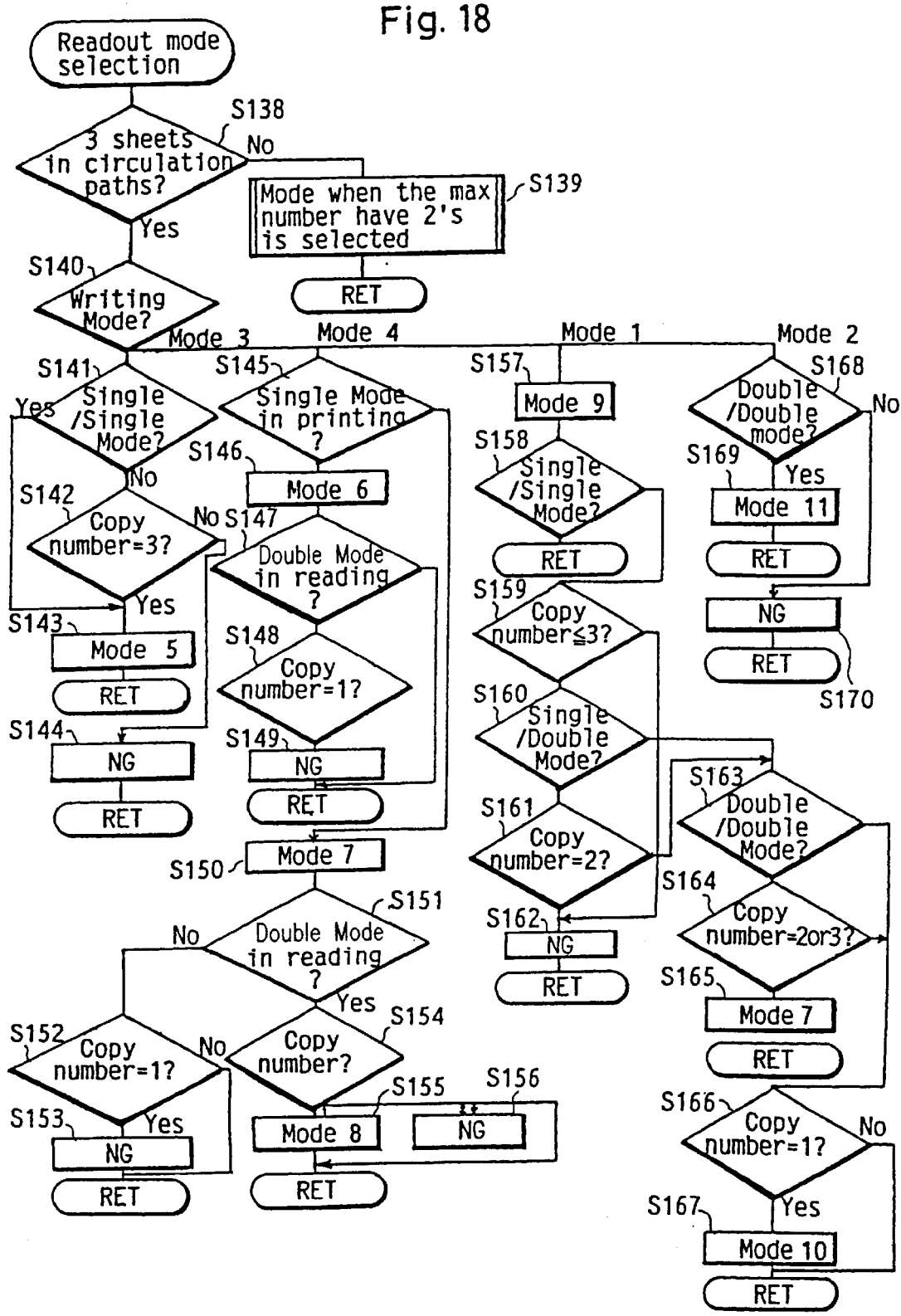
FIG. 18 is a flowchart detailing the image data reading out mode selection.

In Step S138 in FIG. 18, whether the maximum numbers in both the circulation paths have 3's or not is detected. If not, a readout mode for the maximum numbers of 2's is carried out in Step S139 and the sub-routine is terminated, although the detailed explanation of which is omitted herein. Otherwise, the writing mode selected by CPU2 is detected in Step S140.

If it is Mode 3, whether Single/Single Mode is set or not is detected in Step S141. Then, whether the number of copies is 3 or not is detected in Step S142 or a readout mode such that reads out image data from one of the memories alone is selected in Step S143 (Mode 5)—for explanation's convenience, let the first memory be selected. If Single/Single Mode is not selected and the number of copies is a number other than 3, the operation is suspended and CPU4 gives the alarm for incorrect operation or failure in Step S144: this process is hereinafter referred to as NG.

In case that Mode 4 is selected, whether Single-side Mode is selected in printing or not is detected in Step S145. Then, a mode such that reads out image data from both the memories alternately for the number of copies times in succession is selected in Step S146 (Mode 6). Further whether Double-side Mode is selected in image forming or not is detected in Step S147. Then, either the sub-routine is terminated or whether the number of copies is 1 or not is detected in Step S148. If the number of copies is 1, NG is carried out in Step S149; otherwise the sub-routine is terminated.

On the other hand, a mode such that reads out image data from both the memories alternately for three times in succession is selected (Mode 7) in Step S150, and whether Double-side Mode is selected in the image reading assembly 40 is detected in Step S151. Then, either whether the number of copies is 1 or not is detected in Step S152 or the number of copies is checked in Step S154. If the Double-side Mode is not selected and the number of copies is 1, then NG is carried out in Step S153. If the Double-size Mode is not selected and the number of copies is other than 1, the sub-routine is terminated.

If Double-side Mode is selected and the number of copies is 1, a mode such that reads out image data from both the memories alternately is selected in Step S155 (Mode 8) and the sub-routine is terminated; if it is 2, NG is carried out in Step S156 and the sub-routine is terminated; if it is 3 or more, the sub-routine is terminated.

In case that Mode 1 is selected, a mode such that reads out image data from both the memory for (the number of copies×2) times in succession is selected (Mode 9) in Step S157. Subsequently, whether Single/Single Mode is selected or not is detected in Step S158. Then, the sub-routine is terminated or whether the number of copies has 3 or less is detected in Step S159, and whether Single/Double Mode is selected or not is detected in Step S160. Further, whether the number of copies has 2 or not is detected in Step S161. If so in all latter 3 Steps, NG is carried out in Step S162; otherwise, whether Double/Double Mode is selected or not is detected in Step S163. Then, either whether the number of copies is either 2 or 3 is detected in Step S164 and Mode 7 is selected in Step S165, or whether the number of copies is 1 or not is detected in Step S166. If the number of copies is 1, a mode such that reads out image data from both the memories once first and for two times in succession afterwards is selected in Step S167 (Mode 10); otherwise the sub-routine is terminated.

In case that Mode 2 is selected, whether Double/Double Mode is selected or not is detected in Step S168. Then, either a mode such that reads out image data from the first memory for the image transfer onto the front side, while from the second memory onto the back side (Mode 11) is selected in Step S169 and the sub-routine is terminated, or NG is carried out in Step S170 and the sub-routine is terminated.

Once the image data readout mode is selected, the memory switching is subsequently carried out.

Figure 19:
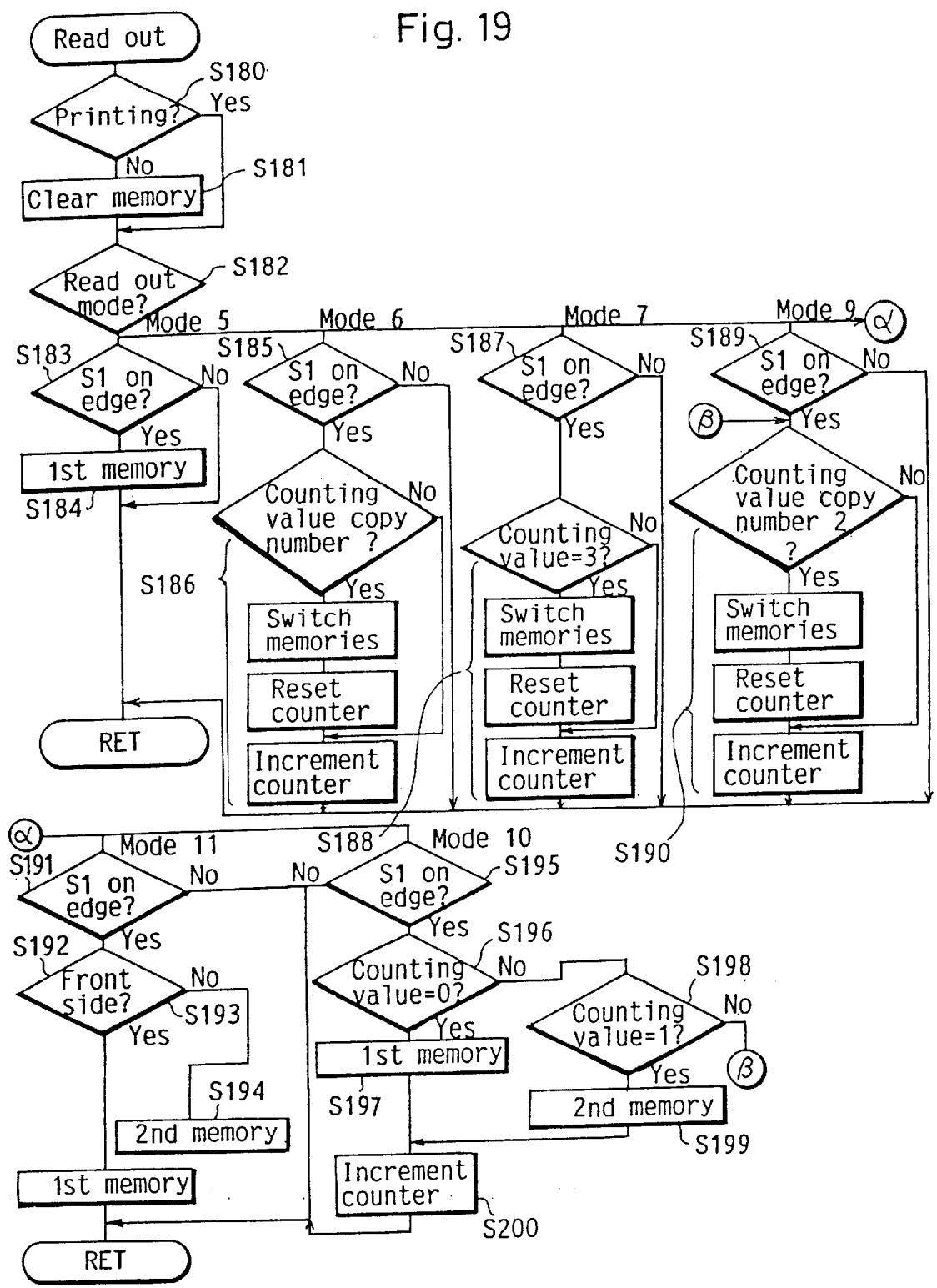
FIG. 19 is a flowchart detailing the memory switching for the image data readout.

In Step S180 in FIG. 19, whether any document is being copied or not is detected. If not, image data in both the memories are cleared in Step S181; otherwise the selected readout mode is immediately detected in Step S182. It should be noted that Mode 8 is deemed to be included in Mode 6 when the number of copies is 1.

In case that Mode 5 is selected, whether S1 is about to be turned on(on-edge) or not is detected in Step S183 to ensure synchronization between the memory switching and the copy sheet detection, and the first memory is selected in Step S184. It should be noted that the appropriate memory is selected by a signal sent to the image data readout switching unit from CPU4.

In case that Mode 6 is selected, whether S1 is on-edge or not is detected in Step S185, and whether the counter of the memory currently used counts up to the number of copies or not is detected in Step S186; then, either the counter is incremented, or the memories are switched, and the counter is cleared, thence incremented.

In case that Mode 7 is selected, whether S1 is on-edge or not is detected in Step S187, and whether the counter of the memory currently used counts up to 3 or not is detected in Step S188; then, either the counter is incremented, or the memories are switched, and the counter is cleared, thence incremented.

In case that Mode 9 is selected, whether S1 is on-edge or not is detected in Step S189, and whether the counter of the memory currently used counts up to (the number of copies× 2) in Step S190; then either the counter is incremented, or the memories are switched, and the counter is cleared, thence incremented.

In case that Mode 11 is selected, whether S1 is on-edge or not is detected in Step S191, and whether or not Double-side Mode is set in printing or not is detected in Step S192. Then, either the first memory is selected in Step S193, or the second memory is selected in Step S194.

In case that Mode 10 is selected, whether S1 is on-edge or not is detected in Step S195, and whether the counter of the memory currently used has 0 or not is detected in Step S196. Then, either the first memory is selected in Step S197 and the counter thereof is incremented in Step S200, or whether the counter of the memory currently used has 1 or not is detected in Step S198, the second memory is selected in Step S199, and the counter thereof is increment in Step S200.

Figure 20:
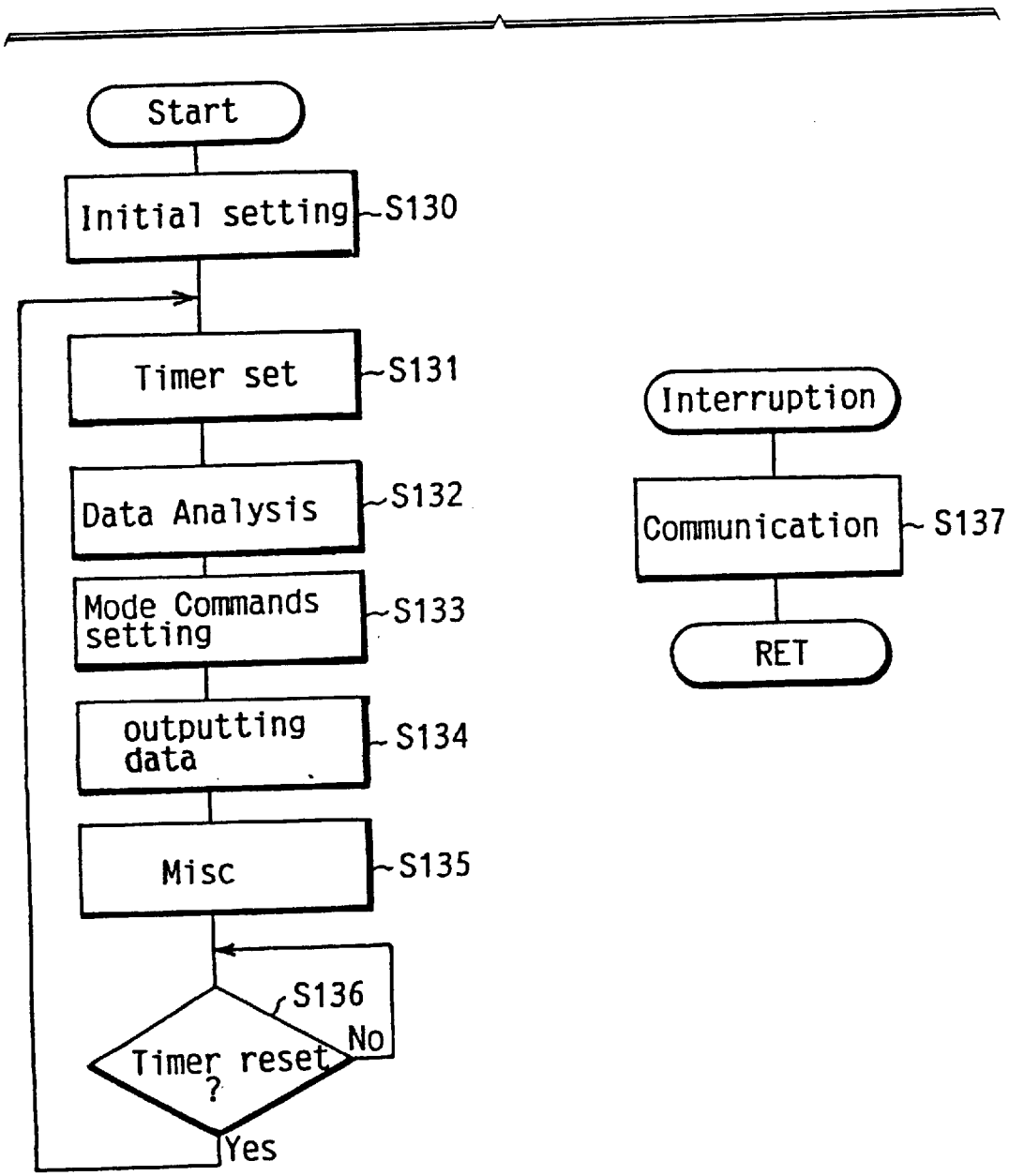
FIG. 20 is a flowchart detailing the operation of CPU 3.
Figure 25A:
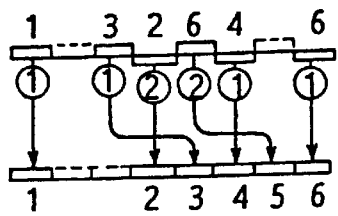
FIGS. 25(a)–25(d) are views explaining the use of memories in Double/Single Mode when the maximum numbers in both the circulation paths have 3's.
Figure 25B:
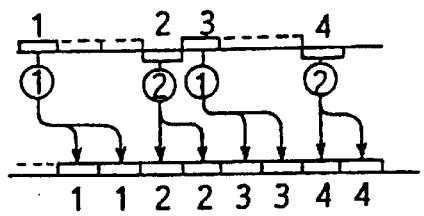
Figure 25C:
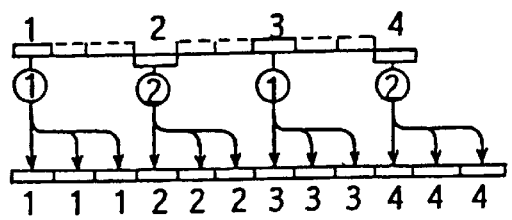
Figure 25D:
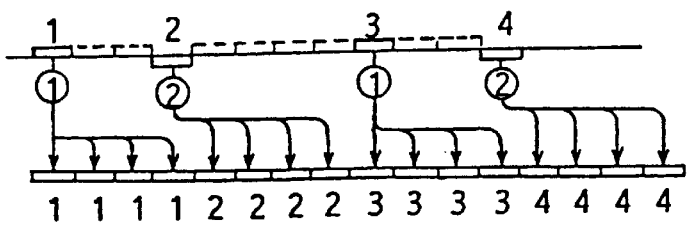
Figure 26A:
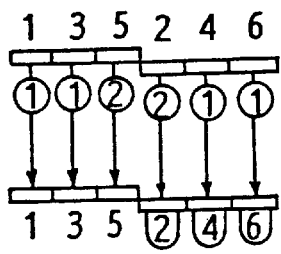
FIGS. 26(a)–26(d) are views explaining the use of memories in Double/Double Mode when the maximum numbers in both the circulation paths have 3's.
Figure 26B:
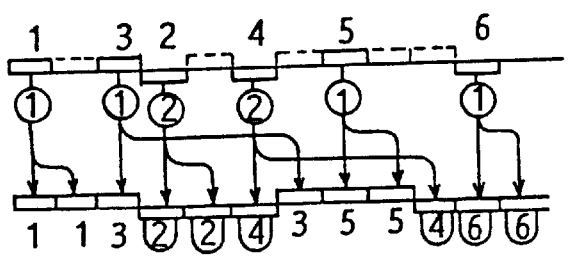
Figure 26C:
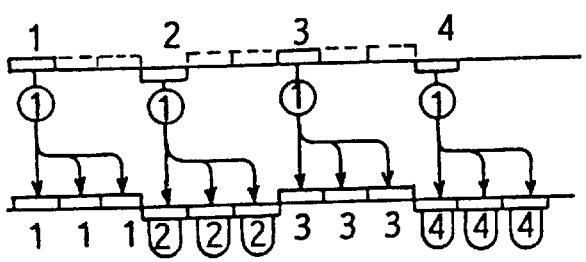
Figure 26D:
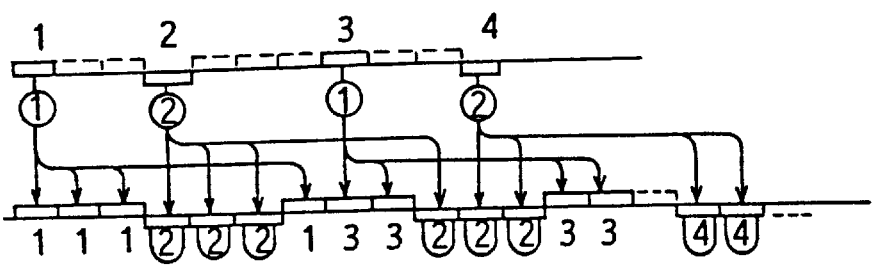
Figure 27A:
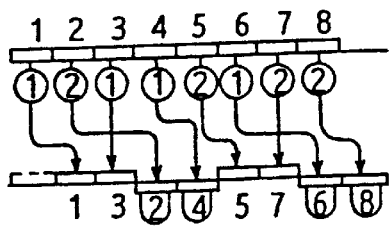
FIGS. 27(a)–27(e) are views explaining the use of the memories in Single/Double Mode when the maximum numbers in both the circulation paths have 2's.
Figure 27B:
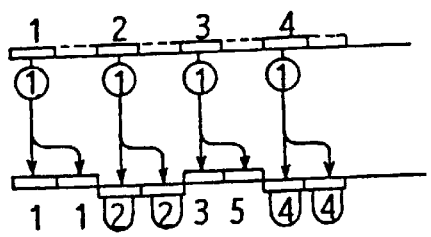
Figure 27C:
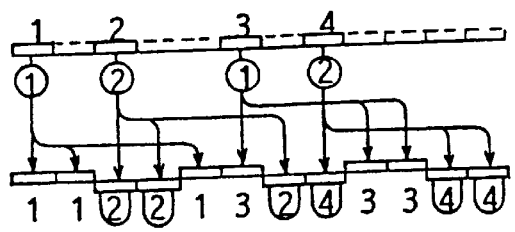
Figure 27D:
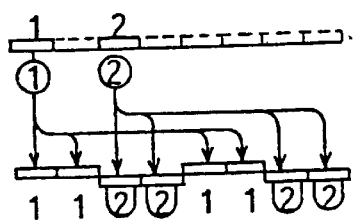
Figure 27E:
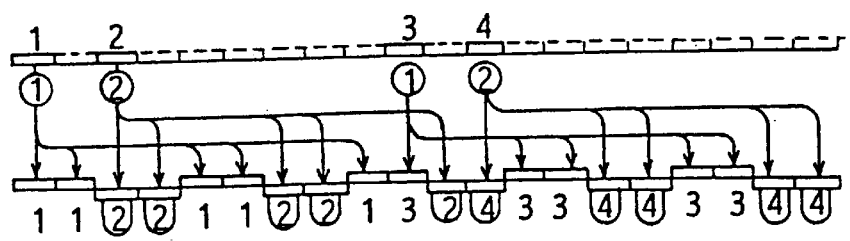
Figure 28A:
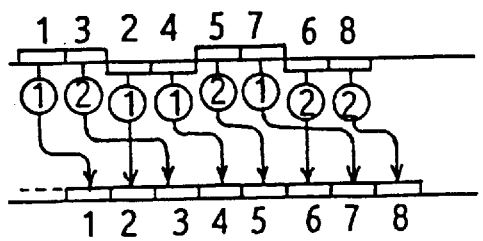
FIGS. 28(a)–28(d) are views explaining the use of the memories in Double/Single Mode when the maximum numbers in both the circulation paths have 2's.
Figure 28B:
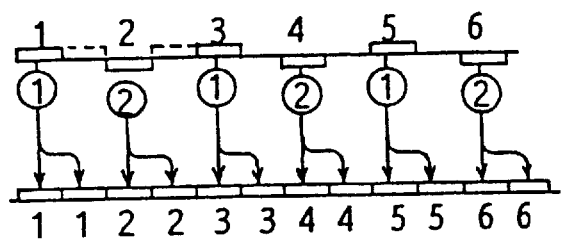
Figure 28C:
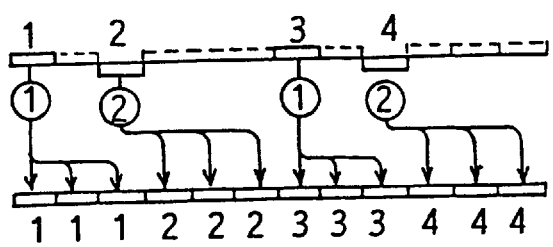
Figure 28D:
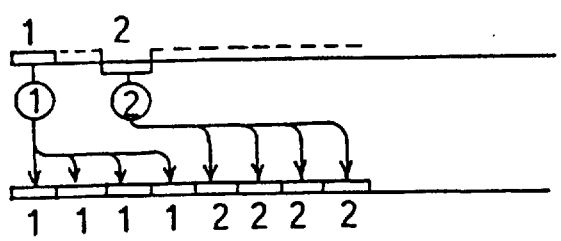
Figure 29A:
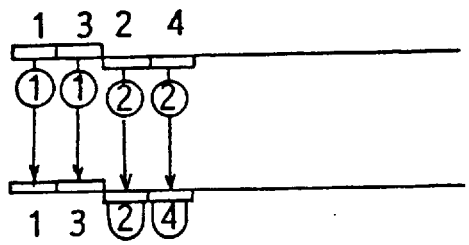
FIGS. 29(a)–29(d) are views explaining the use of the memories in Double/Double Mode when the maximum numbers in both the circulation paths have 2's.
Figure 29B:
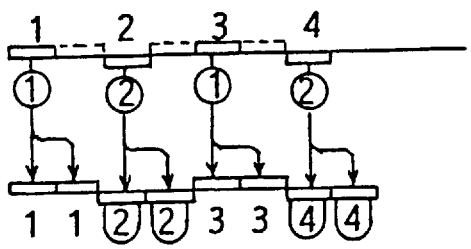
Figure 29C:
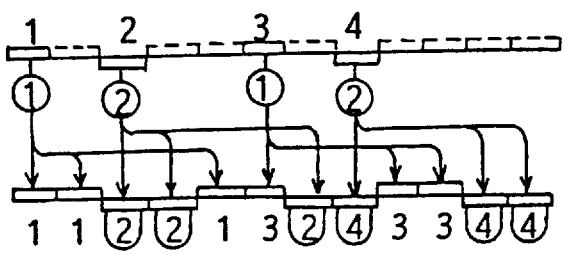
Figure 29D:
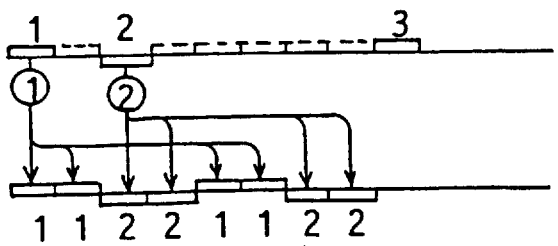
Figure 30A:
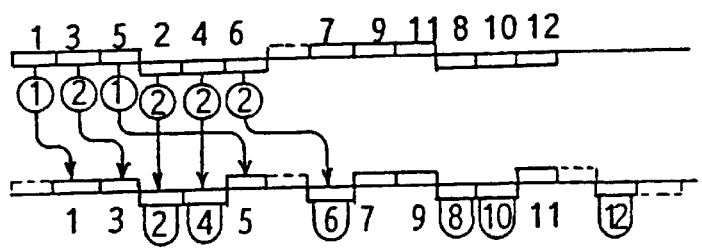
FIGS. 30(a)–30(d) are views explaining the use of the memories in Double/Double Mode when the maximum number in the document circulation path has 3 while that in the copy sheet circulation path has 2.
Figure 30B:
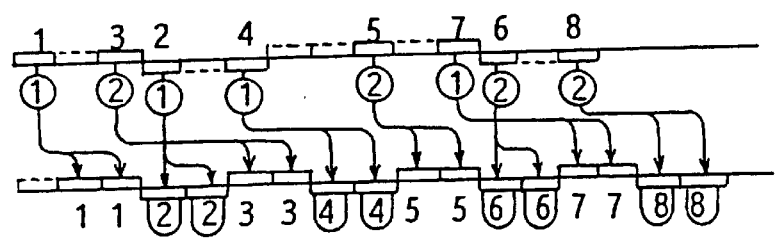
Figure 30C:
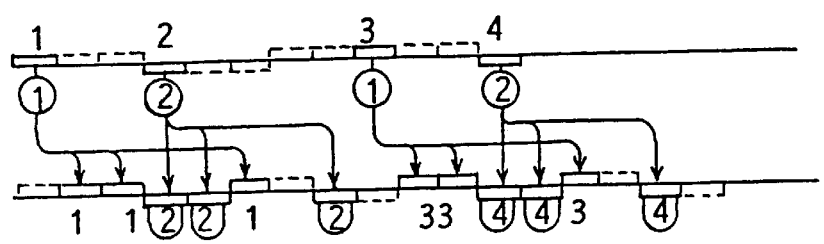
Figure 30D:
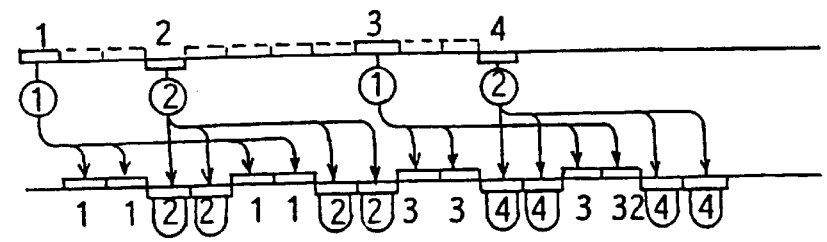
Figure 31A:
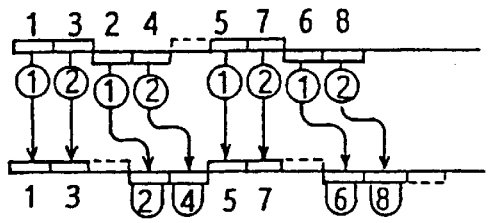
FIGS. 31(a)–31(f) are views explaining the use of the memories in Double/Double Mode when the maximum number in the document circulation path has 2 while that in the copy sheet circulation path has 3.
Figure 31B:
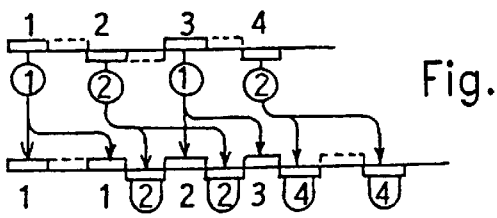
Figure 31C:
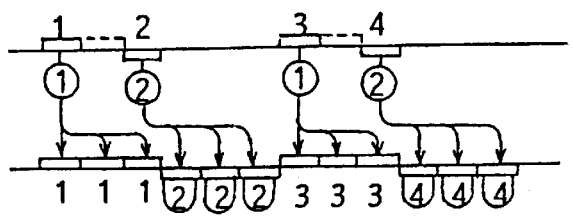
Figure 31D:
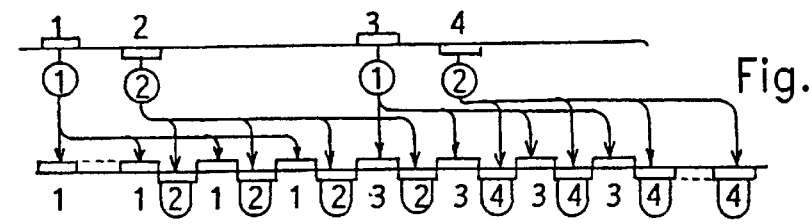
Figure 31E:
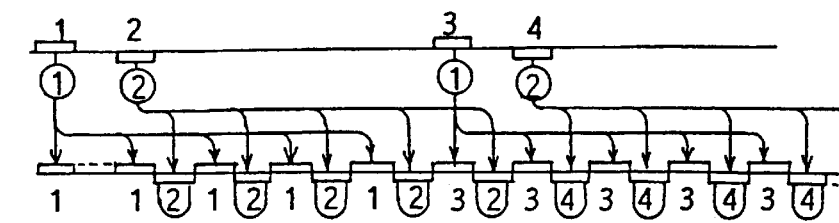
Figure 31F:
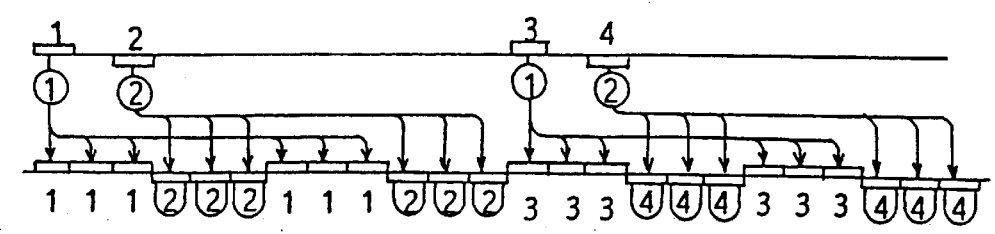

It is CPU3 that controls the entire operation of the digital copier, and a flowchart in FIG. 20 details the method thereof.

In Step S130, the initial setting is carried out, and the internal timer is set in Step S131. In Step S132, input data related to the setting conditions are analyzed and side-modes and respective commands are set in Step S133. In Step S134, data related to the selected side-mode and command are outputted accordingly, and miscellaneous conditions are checked in Step S135. In Step S136, whether the internal timer is reset or not is detected. If so, the internal timer is set again; otherwise, the detection is repeated. The input data are validated through communication with other CPU's. When there is a change in the operation condition, CPU3 suspends an ongoing operation and outputs data containing information of change to the concerned CPU's in Step S137, and returns to the suspended operation.

The relation between the image data writing and readout modes are explained in FIGS. 21(a)–21(e) when the maximum number have 3's, and when the maximum number have 2's in FIGS. 22(a)–22(e): FIG. 21(a) is for Mode 3, FIG. 21(b) is for Mode 4, FIG. 21(c) is for Mode 1, FIG. 21(d) is for Mode 2, and FIG. 21(e) is for Mode 11. Marks o and x denote availability and non-availability, respectively.

More precisely, when the maximum numbers both in the circulation paths have 3's, the relations among the image data writing and readout modes and the number of copies in Single/Single Mode, Single/Double Mode, Double/Single Mode, and Double/Double Mode are respectively shown in FIGS. 23(a), 23(b), 24(a)–24(e), 25(a)–25(d) and 26(a)–26(d), and FIGS. 26(a)–26(d) are explained by way of an example.

In the drawing, numerals at the left denote the number of copies, rectangles in the upper row indicate the documents and those in the lower row indicate the copy sheets; rectangles slightly slid down in both rows indicate the back sides of the documents and copy sheets. Numeral 1 in the circle denotes the first memory and numeral 2 in the circle denotes the second memory. The front sides of both the documents and the copy sheets are given odd numbers serially and the back sides thereof are given even numbers serially. In addition, respective Modes are given at the right.

As previously explained in FIG. 9, when the number of copies is 1 in Double/Double Mode, the documents are fed in a cycle [3 documents are fed and the feeding is suspended for 3 printing]; Mode 9 is selected for Mode 1 as is explained in FIG. 18. Thus, the images on the front sides of the first three documents are read, thence those of the back sides; the image data obtained by the reading are stored into the two memories for two times in succession alternately; accordingly, the image data stored therein are read out for two times in succession alternately. As a result, the images on the front sides of the first three documents are copied onto the front side of the first three copy sheets, and the back sides of the first three documents are copied onto the back sides of the first three copy sheets, respectively.

Likewise, when the number of copies is 2, Mode 7 is selected for Mode 1; when the number of copies is 3, Mode 5 is selected for Mode 3; when the number of copies is 4, Mode 11 is selected for Mode 2, although further explanation is omitted herein.

In this embodiment, although specific modes are not given to the case when the maximum numbers have 2's, the relations among the documents, copy sheets, and the memories in Single/Double Mode, Double/Single Mode and Double/Double Mode are illustrated respectively in FIGS. 27(a)–27(e), 28(a)–28(d), and 29(a)–29(d). The relations in Single/Single Mode is omitted, as it is identical with the corresponding Mode when the maximum numbers have 3's in FIG. 23(b).

In addition, there is a case when the maximum number in the circulation path 9 is 2, while that in the circulation path 58 is 3. In this case, the relation in Single/Double Mode is identical in the corresponding Mode when the maximum numbers in both the circulation paths are 2's. The relation in Single/Single Mode and Double/Single Mode is identical with the corresponding Modes when the maximum numbers in both the circulation paths are 3's. The relation in Double/Double Mode is illustrated in FIGS. 30(a)–30(d), although the detailed explanation is omitted herein.

Also, there is a case when the maximum number in the circulation path 9 is 3, while that in the circulation path 58 is 2. In this case, the relation in Single/Double Mode is identical with the corresponding Mode when the maximum numbers in both the circulation paths are 2's. The relation in Single/Single and Double/Single Modes are identical with the corresponding Modes when the maximum numbers in both the circulation paths are 3's. The relation in Double/Double Mode is illustrated in FIGS. 31(a)–31(f), and also the detailed explanation is omitted herein.

Figure 32A:
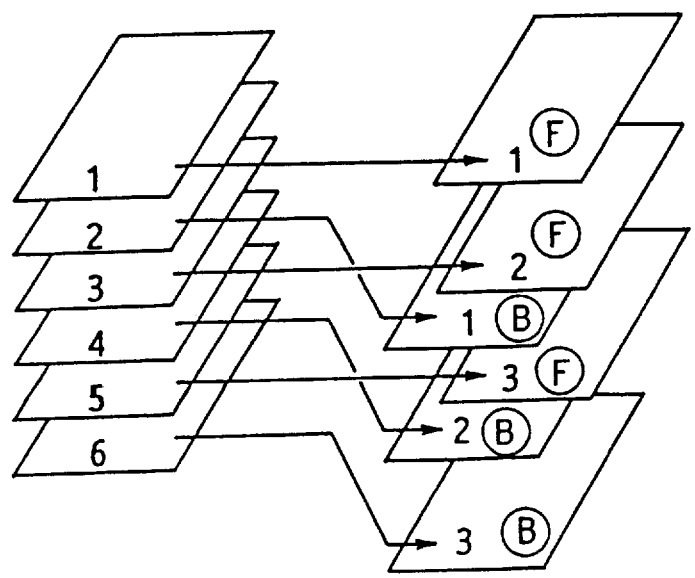
FIGS. 32(a) and 32(b) are views explaining the correspondence between the sides of the documents and the copy sheets in Single/Double Mode.
Figure 32B:
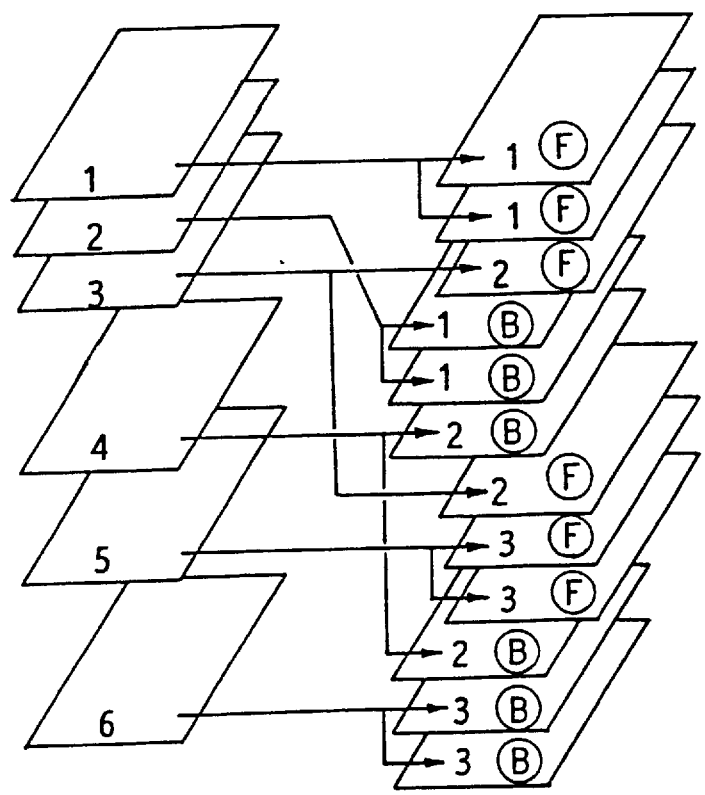
Figure 33A:
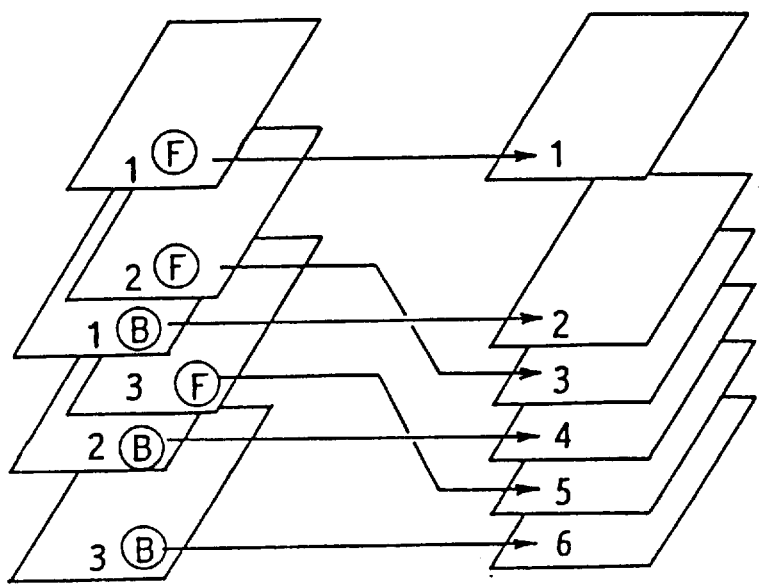
FIGS. 33(a) and 33(b) are views explaining the correspondence between the sides of the documents and the copy sheets in Double/Single Mode.
Figure 33B:
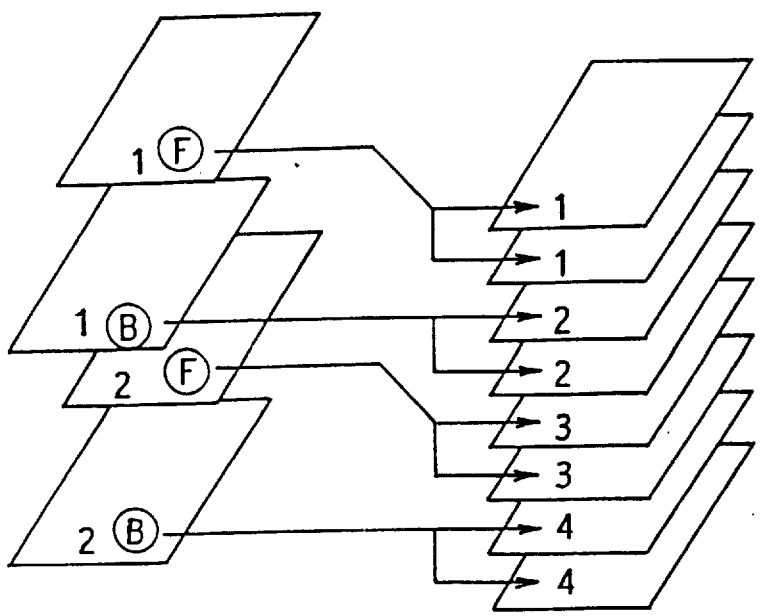
Figure 34A:
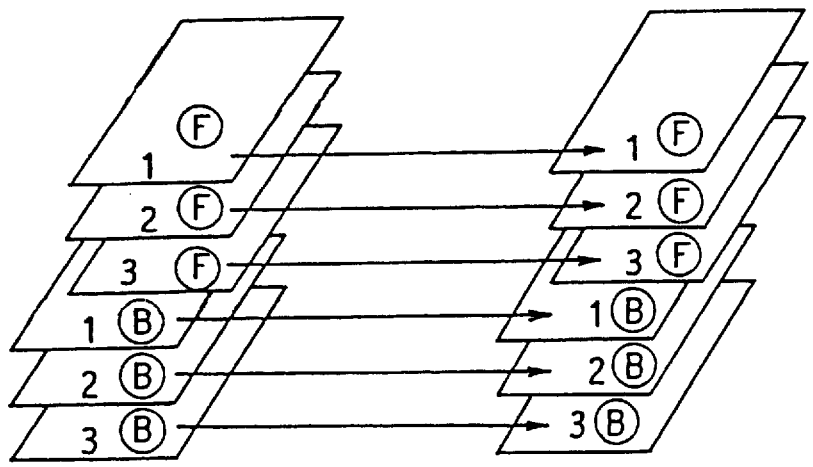
FIGS. 34(a) and 34(b) are views explaining the correspondence between the sides of the documents and the copy sheets in Double/Double Mode.
Figure 34B:
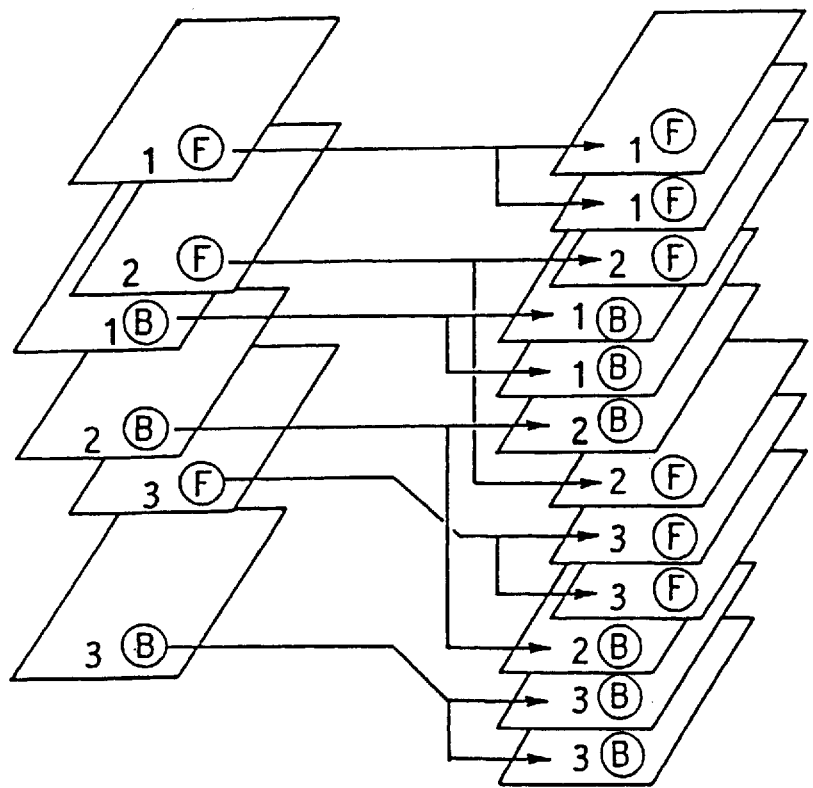

The correspondence between the sides of documents and those of copy sheets in Single/Double Mode is explained in FIGS. 32(a) and 32(b). In these drawing, rectangles in the left are documents, while those in the right are copy sheets; a capital letter F in a circle denotes the front side of the copy sheets and a capital letter B denotes the back side; the direction of the arrows indicates the correspondence between the documents and copy sheets; and numerals at the right denotes the number of copies.

The case when the number of copies is 1 is explained by way of an example. The Documents 1–6 are fed successively, while Copy Sheets 1–3 are fed through a cycle of copy sheet 1-Ⓕ, copy sheet 2-Ⓕ, copy sheet 1-Ⓑ, copy sheet 3-Ⓕ, copy sheet 2-Ⓑ, and copy sheet 3-Ⓑ.

In this way, the image on the front side of Document 1 is transferred onto the front side of Copy Sheet 1, and an image the front side of Document 2 is transferred on the back side of Copy Sheet 1. Accordingly, images on the front sides of Documents 3 and 4 are transferred on the front side and back side of Copy Sheet 2, and those on the front sides of Documents 5 and 6 on the front side and the back side of Copy Sheet 3, respectively.

The detailed explanation when the number of copies is 2 or more are omitted herein. The detailed explanation of cases in Double/Single and Double/Double Mode which are respectively shown in FIGS. 33(a) and 33(b) and 34(a) and 34(b) is omitted as well.

IRU, which reads an image while the document passes through the optical system in the reading unit, is used as the image reader herein, but it can be replaced with another well known image reading unit which reads an image by scanning image reading elements under the document fed by ADF(Auto Document Feeder) and suspended at the reading position.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A digital copier for copying images of documents on a plurality of sheets, comprising:

image reading means for reading an image on a document having at least one page and for outputting image data corresponding to the read image;

storing means for storing the image data read by the image reading means, the storing means comprising a first area and a second area;

write means for writing the image data corresponding to the at least one document page into the first area and the second area of the storing means in a predetermined order;

read means for reading out the image data corresponding to the at least one document page from the first area and the second area of the storing means in a predetermined order;

image forming means for forming an image on at least one sheet based on the image data read out from the storing means;

input means for inputting a number of sets of copies; and changing means for changing at least either one of the predetermined order of reading out the image data or the predetermined order of writing the image data in response to the number inputted by the input means.

2. A digital copier of claim 1, wherein the write means includes:

a first writing mode for alternately writing image data into the first area and the second area;

a second writing mode for writing image data into only one of the first area and the second area; and a third writing mode for writing image data into the first area and the second area in the predetermined order;

all of said first, second and third printing mode being predetermined by copying conditions and a maximum number of documents temporarily kept in a document circulation path.

3. A digital copier of claim 1, wherein the image reading means includes:

a first readout mode for alternately reading out the image data written into the first area and the second area;

a second readout mode for reading out the image data written into only one of the first area and the second area;

a third readout mode for alternately reading out the image data written into both the first area and the second area for a predetermined number of times; and a fourth readout mode for reading out the image data of front sides of the documents written into the first area and the image data of the back sides of the documents written into the second area.

4. A digital copier of claim 1, wherein the changing means also sets the predetermine order of writing the image data in response to the number inputted by the input means.

5. A digital copier of claim 1, further comprising:

means for selecting one of a single-side mode for producing an image on one side of a sheet and a double-side mode for producing images on both sides of a sheet, the predetermined order of reading out the image data being also changed in response to the number inputted by the input means and in response to whether the single-side mode or the double-side mode is selected by the selecting means.

6. A digital copier for copying images of documents on a plurality of sheets, comprising:

image reading means for reading an image on a document having at least one page and for outputting image data corresponding to the read image;

storing means for storing the image data read by the image reading means, the storing means comprising a first area and a second area;

write means for writing the image data corresponding to the at least one document page into the first area and the second area of the storing means in a predetermined order;

read means for reading out the image data corresponding to the at least one document page from the first area and the second area of the storing means in a predetermined order;

image forming means for forming an image on at least one sheet based on the image data read out from the storing means;

setting means for setting a copying mode; and changing means for changing at least either one of the predetermined order of reading out the image data or the predetermined order of writing the image date in response to the copying mode set by said setting means.

7. A digital copier as defined in claim 6, wherein said setting means sets either one of a simplex copying mode and a duplex copying mode.

* * * * *

UNITED STATES PATENT AND TRADEMARK OFFICE
CERTIFICATE OF CORRECTION

PATENT NO. : 5,883,660
DATED : March 16, 1999
INVENTOR(S) : Akio KATO et al

It is certified that error appears in the above-identified patent and that said Letters Patent is hereby corrected as shown below:

Title page, item [30], Foreign Application Priority Data

After "Jun. 22," delete "1991" and insert --1992--.

Column 17, line 1, delete "printing" and insert --writing--.

Column 17, line 21, delete "predetermine" and insert --predetermined--.

Signed and Sealed this

Second Day of May, 2000

Attest:

Q. TODD DICKINSON

Attesting Officer

Director of Patents and Trademarks